US007887752B2

(12) United States Patent
Heiner et al.

(10) Patent No.: US 7,887,752 B2
(45) Date of Patent: Feb. 15, 2011

(54) CHEMICAL REACTION MONITOR

(75) Inventors: David Louis Heiner, San Diego, CA (US); Steven P. Fambro, Carlsbad, CA (US); Theo Kotseroglou, San Diego, CA (US); Michal Lebl, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 1104 days.

(21) Appl. No.: 10/762,931

(22) Filed: Jan. 21, 2004

(65) Prior Publication Data

US 2004/0219063 A1 Nov. 4, 2004

Related U.S. Application Data

(60) Provisional application No. 60/441,752, filed on Jan. 21, 2003.

(51) Int. Cl.
*G01N 21/01* (2006.01)
*G01N 21/75* (2006.01)

(52) U.S. Cl. .................. 422/68.1; 422/82.05; 436/50

(58) Field of Classification Search .............. 422/68.1, 422/82.05; 436/50
See application file for complete search history.

(56) References Cited

U.S. PATENT DOCUMENTS

| 3,586,484 A | 6/1971 | Anderson, II et al. |
| 3,748,975 A | 7/1973 | Tarabocchia |
| 4,200,110 A | 4/1980 | Peterson et al. |
| 4,448,485 A | 5/1984 | Bergman et al. |
| 4,499,052 A | 2/1985 | Fulwyler |
| 4,682,895 A | 7/1987 | Costello |
| 4,721,769 A | 1/1988 | Rubner |
| 4,729,949 A | 3/1988 | Weinreb et al. |
| 4,772,540 A | 9/1988 | Deutsch et al. |
| 4,785,814 A | 11/1988 | Kane |
| 4,822,746 A | 4/1989 | Walt |
| 4,824,789 A | 4/1989 | Yafuso et al. |
| 4,842,783 A | 6/1989 | Blaylock |
| 4,868,130 A | 9/1989 | Hargeaves |
| 4,879,097 A | 11/1989 | Whitehead et al. |
| 4,894,343 A | 1/1990 | Tanaka et al. |

(Continued)

FOREIGN PATENT DOCUMENTS

EP 0 039 888 B1 11/1981

(Continued)

OTHER PUBLICATIONS

Abel, A.P., et al., "Fiber-optic evanescent wave biosensor of oligonucleotides," *Anal. Chem.* 68(17):2905-2912 (Sep. 1996).

(Continued)

*Primary Examiner*—In Suk Bullock
*Assistant Examiner*—Paul S Hyun
(74) *Attorney, Agent, or Firm*—Knobbe Martens Olson & Bear LLP

(57) ABSTRACT

Disclosed herein are systems for monitoring chemical reactions. The systems can comprise a lighting device, a camera device for obtaining an image of the chemical reaction mixtures and an analyzer program to process data obtained from the image. Also disclosed are methods of monitoring the progress of chemical reactions using the these systems.

41 Claims, 8 Drawing Sheets

U.S. PATENT DOCUMENTS

| | | |
|---|---|---|
| 4,895,805 A | 1/1990 | Sato et al. |
| 4,981,783 A | 1/1991 | Augenlicht |
| 4,999,306 A | 3/1991 | Yafuso et al. |
| 5,002,867 A | 3/1991 | Macevicz |
| 5,015,843 A | 5/1991 | Seitz et al. |
| 5,019,350 A | 5/1991 | Rhum et al. |
| 5,026,599 A | 6/1991 | Koskenmaki |
| 5,061,336 A | 10/1991 | Soane |
| 5,071,531 A | 12/1991 | Soane |
| 5,105,305 A | 4/1992 | Betzig et al. |
| 5,110,745 A | 5/1992 | Kricka et al. |
| 5,132,242 A | 7/1992 | Cheung |
| 5,135,627 A | 8/1992 | Soane |
| 5,143,853 A | 9/1992 | Walt |
| 5,152,287 A | 10/1992 | Kane |
| 5,176,881 A | 1/1993 | Sepaniak et al. |
| 5,177,012 A | 1/1993 | Kim et al. |
| 5,185,178 A | 2/1993 | Koskenmaki |
| 5,185,243 A | 2/1993 | Ullman et al. |
| 5,194,300 A | 3/1993 | Cheung |
| 5,222,092 A | 6/1993 | Hench et al. |
| 5,244,636 A | 9/1993 | Walt et al. |
| 5,244,813 A | 9/1993 | Walt et al. |
| 5,250,264 A | 10/1993 | Walt et al. |
| 5,252,494 A | 10/1993 | Walt |
| 5,296,375 A | 3/1994 | Kricka et al. |
| 5,298,741 A | 3/1994 | Walt et al. |
| 5,302,509 A | 4/1994 | Cheeseman |
| 5,304,487 A | 4/1994 | Wilding et al. |
| 5,308,771 A | 5/1994 | Zhou et al. |
| 5,310,674 A | 5/1994 | Weinreb et al. |
| 5,320,814 A | 6/1994 | Walt et al. |
| 5,338,831 A | 8/1994 | Lebl et al. |
| 5,342,585 A | 8/1994 | Lebl et al. |
| 5,342,737 A | 8/1994 | Georger, Jr. et al. |
| 5,357,590 A | 10/1994 | Auracher |
| 5,447,692 A | 9/1995 | Keenan et al. |
| 5,481,629 A | 1/1996 | Tabuchi |
| 5,486,335 A | 1/1996 | Wilding et al. |
| 5,494,798 A | 2/1996 | Gerdt et al. |
| 5,496,997 A | 3/1996 | Pope |
| 5,498,392 A | 3/1996 | Wilding et al. |
| 5,506,141 A | 4/1996 | Weinreb et al. |
| 5,512,490 A | 4/1996 | Walt et al. |
| 5,516,635 A | 5/1996 | Ekins et al. |
| 5,518,863 A | 5/1996 | Pawluczyk |
| 5,537,000 A | 7/1996 | Alivisatos et al. |
| 5,541,311 A | 7/1996 | Dahlberg et al. |
| 5,545,531 A | 8/1996 | Rava et al. |
| 5,554,516 A | 9/1996 | Kacian et al. |
| 5,585,069 A | 12/1996 | Zanzucchi et al. |
| 5,587,128 A | 12/1996 | Wilding et al. |
| 5,589,351 A | 12/1996 | Harootunian |
| 5,593,838 A | 1/1997 | Zanzucchi et al. |
| 5,595,915 A | 1/1997 | Geysan |
| 5,603,351 A | 2/1997 | Cherukuri et al. |
| 5,604,097 A | 2/1997 | Brenner |
| 5,610,287 A | 3/1997 | Nikiforov et al. |
| 5,631,170 A | 5/1997 | Attridge |
| 5,631,337 A | 5/1997 | Sassi et al. |
| 5,632,876 A | 5/1997 | Zanzucchi et al. |
| 5,632,957 A | 5/1997 | Heller et al. |
| 5,633,972 A | 5/1997 | Walt et al. |
| 5,637,469 A | 6/1997 | Wilding et al. |
| 5,639,603 A | 6/1997 | Dower et al. |
| 5,640,234 A | 6/1997 | Roth et al. |
| 5,643,738 A | 7/1997 | Zanzucchi et al. |
| 5,647,030 A | 7/1997 | Jorgensen et al. |
| 5,649,576 A | 7/1997 | Kirk et al. |
| 5,656,241 A | 8/1997 | Seifert et al. |
| 5,656,815 A | 8/1997 | Justus et al. |
| 5,671,303 A | 9/1997 | Shieh et al. |
| 5,674,698 A | 10/1997 | Zarling |
| 5,677,196 A | 10/1997 | Herron et al. |
| 5,681,484 A | 10/1997 | Zanzucchi et al. |
| 5,690,894 A | 11/1997 | Pinkel et al. |
| 5,702,915 A | 12/1997 | Miyamoto |
| 5,714,330 A | 2/1998 | Brenner et al. |
| 5,726,026 A | 3/1998 | Wilding et al. |
| 5,747,169 A | 5/1998 | Fan et al. |
| 5,747,180 A | 5/1998 | Miller et al. |
| 5,750,015 A | 5/1998 | Soane et al. |
| 5,751,018 A | 5/1998 | Alivisatos et al. |
| 5,755,942 A | 5/1998 | Zanzucchi et al. |
| 5,763,175 A | 6/1998 | Brenner |
| 5,770,029 A | 6/1998 | Nelson et al. |
| 5,770,157 A | 6/1998 | Cargill |
| 5,780,231 A | 7/1998 | Brenner |
| 5,795,714 A | 8/1998 | Cantor et al. |
| 5,795,716 A | 8/1998 | Chee et al. |
| 5,814,524 A | 9/1998 | Walt et al. |
| 5,830,711 A | 11/1998 | Barany et al. |
| 5,837,196 A | 11/1998 | Pinkel et al. |
| 5,840,256 A | 11/1998 | Demers et al. |
| 5,843,655 A | 12/1998 | McGall |
| 5,846,842 A | 12/1998 | Herron et al. |
| 5,849,215 A | 12/1998 | Gin et al. |
| 5,854,033 A | 12/1998 | Lizardi |
| 5,854,684 A | 12/1998 | Stabile et al. |
| 5,856,083 A | 1/1999 | Chelsky et al. |
| 5,858,732 A | 1/1999 | Solomon et al. |
| 5,863,708 A | 1/1999 | Zanzucchi et al. |
| 5,863,722 A | 1/1999 | Brenner |
| 5,866,331 A | 2/1999 | Singer et al. |
| 5,874,219 A | 2/1999 | Rava et al. |
| 5,876,924 A | 3/1999 | Zhang et al. |
| 5,881,200 A | 3/1999 | Burt |
| 5,888,885 A | 3/1999 | Xie |
| 5,900,481 A | 5/1999 | Lough et al. |
| 6,005,707 A | 12/1999 | Berggren et al. |
| 6,008,892 A | 12/1999 | Kain et al. |
| 6,023,540 A | 2/2000 | Walt et al. |
| 6,027,889 A | 2/2000 | Barany et al. |
| 6,037,186 A | 3/2000 | Stimpson |
| 6,039,894 A | 3/2000 | Sanjurjo et al. |
| 6,045,760 A | 4/2000 | Aizawa et al. |
| 6,051,380 A | 4/2000 | Sosnowski et al. |
| 6,054,564 A | 4/2000 | Barany et al. |
| 6,071,748 A | 6/2000 | Modin et al. |
| 6,074,754 A | 6/2000 | Jacobsen et al. |
| 6,083,763 A | 7/2000 | Balch |
| 6,087,114 A | 7/2000 | Rider |
| 6,090,549 A | 7/2000 | Mirzabekov et al. |
| 6,096,496 A | 8/2000 | Frankel |
| 6,100,973 A | 8/2000 | Lawandy |
| 6,121,054 A | 9/2000 | Lebl |
| 6,121,075 A | 9/2000 | Yamashita |
| 6,129,896 A | 10/2000 | Noonan et al. |
| 6,130,046 A | 10/2000 | Smith et al. |
| 6,139,626 A | 10/2000 | Norris et al. |
| 6,172,218 B1 | 1/2001 | Brenner |
| 6,200,737 B1 | 3/2001 | Walt et al. |
| 6,207,392 B1 | 3/2001 | Weiss et al. |
| 6,210,910 B1 | 4/2001 | Walt et al. |
| 6,251,639 B1 | 6/2001 | Kurn |
| 6,261,782 B1 | 7/2001 | Lizardi et al. |
| 6,266,459 B1 | 7/2001 | Walt et al. |
| 6,268,147 B1 | 7/2001 | Beattie et al. |
| 6,268,148 B1 | 7/2001 | Barany et al. |
| 6,274,323 B1 | 8/2001 | Bruchez et al. |
| 6,280,935 B1 | 8/2001 | Macevicz |
| 6,306,643 B1 | 10/2001 | Gentalen et al. |
| 6,327,410 B1 | 12/2001 | Walt et al. |
| 6,355,431 B1 | 3/2002 | Chee et al. |

| | | | |
|---|---|---|---|
| 6,448,064 B1 * | 9/2002 | Vo-Dinh et al. | 435/287.2 |
| 6,485,913 B1 * | 11/2002 | Becker et al. | 506/13 |
| 6,663,832 B2 | 12/2003 | Lebl et al. | |
| 6,825,927 B2 | 11/2004 | Goldman et al. | |
| 2003/0016897 A1 | 1/2003 | Walt et al. | |
| 2003/0035109 A1 * | 2/2003 | Hartwich et al. | 356/435 |
| 2003/0143591 A1 * | 7/2003 | Davies et al. | 435/6 |
| 2003/0207441 A1 * | 11/2003 | Eyster et al. | 435/287.1 |
| 2004/0067164 A1 * | 4/2004 | VanBrunt et al. | 422/63 |

FOREIGN PATENT DOCUMENTS

| | | |
|---|---|---|
| EP | 0 392 546 A2 | 10/1990 |
| EP | 0 539 888 A1 | 5/1993 |
| EP | 0 572 157 A1 | 12/1993 |
| EP | 0 799 897 A1 | 10/1997 |
| EP | 1 128 310 A2 | 8/2001 |
| EP | 1 128 310 A3 | 8/2001 |
| FR | 2 741 357 A1 | 5/1997 |
| GB | 2 294 319 A | 4/1996 |
| GB | 2 315 130 A | 1/1998 |
| GB | 2 315 131 A | 1/1998 |
| WO | WO 90/09885 A1 | 9/1990 |
| WO | WO 93/18434 A1 | 9/1993 |
| WO | WO 93/25563 A1 | 12/1993 |
| WO | WO 94/12863 A1 | 6/1994 |
| WO | WO 95/21271 A1 | 8/1995 |
| WO | WO 95/33070 A1 | 12/1995 |
| WO | WO 96/03212 A1 | 2/1996 |
| WO | WO 96/04547 A1 | 2/1996 |
| WO | WO 96/15271 A1 | 5/1996 |
| WO | WO 96/36436 A1 | 11/1996 |
| WO | WO 97/12030 A1 | 4/1997 |
| WO | WO 97/13870 A1 | 4/1997 |
| WO | WO 97/14028 A2 | 4/1997 |
| WO | WO 97/14028 A3 | 4/1997 |
| WO | WO 97/31256 A2 | 8/1997 |
| WO | WO 97/31256 A3 | 8/1997 |
| WO | WO 97/45559 A1 | 12/1997 |
| WO | WO 97/46704 A1 | 12/1997 |
| WO | WO 98/08092 A1 | 2/1998 |
| WO | WO 98/13523 A1 | 4/1998 |
| WO | WO 98/29736 A1 | 7/1998 |
| WO | WO 98/31836 A1 | 7/1998 |
| WO | WO 98/40726 A1 | 9/1998 |
| WO | WO 98/46797 A1 | 10/1998 |
| WO | WO 98/50782 A2 | 11/1998 |
| WO | WO 98/50782 A3 | 11/1998 |
| WO | WO 98/53093 A1 | 11/1998 |
| WO | WO 99/00663 A1 | 1/1999 |
| WO | WO 99/04228 A2 | 1/1999 |
| WO | WO 99/04228 A3 | 1/1999 |
| WO | WO 99/05320 A1 | 2/1999 |
| WO | WO 99/09394 A1 | 2/1999 |
| WO | WO 99/18434 A1 | 4/1999 |
| WO | WO 99/34931 A1 | 7/1999 |
| WO | WO 99/39001 A2 | 8/1999 |
| WO | WO 99/64867 A1 | 12/1999 |
| WO | WO 99/67414 A1 | 12/1999 |
| WO | WO 00/04372 A1 | 1/2000 |
| WO | WO 00/39587 A1 | 7/2000 |
| WO | WO 00/44491 A2 | 8/2000 |
| WO | WO 00/44491 A3 | 8/2000 |
| WO | WO 00/47767 A1 | 8/2000 |
| WO | WO 00/47996 A2 | 8/2000 |
| WO | WO 00/47996 A3 | 8/2000 |
| WO | WO 01/69210 A1 * | 9/2001 |
| WO | WO 02/04123 A1 | 1/2002 |
| WO | WO 02/16040 A1 | 2/2002 |

OTHER PUBLICATIONS

Angel, S.M., "Optrodes: Chemically Selective Fiber-Optic Sensors," *Spectroscopy* 2(4):38-47 (1987).

Barnard, S.M., et al., "Fiber-optic organic vapor sensor," *Environ. Sci. Technol.* 25(7):1301-1304 (Jul. 1991).

Ben-Dor, A., et al., "Universal DNA Tag Systems: A combinatorial design scheme," *J. Comput. Biol.* 7(3/4):503-519 (2000).

Birindelli, S., et al., "Letter to the Editor: Comments on Adaptation of the Cellscan Technique for the SCM Test in Breast Cancer Rahmani et al., Eur. J. Cancer, 32A, No. 10, pp. 1758-1765 1996." *Eur. J. Cancer* 33(8):1333-1334 (Jul. 1997).

Carey, W.P., et al., "Chemical piezoelectric sensor and sensor array characterization," *Anal. Chem.* 58(14):3077-3084 (Dec. 1986).

Castaño, J.P., et al., "Dynamic Monitoring and Quantification of Gene Expression in Single, Living Cells: A Molecular Basis for Secretory Cell Heterogeneity," *Mol. Endoctinol.* 10(5):599-605 (May 1996).

Chen, G., et al., "Observation and Quantitation of Exocytosis from the Cell Body of a Fully Developed Neuron in *Planorbis corneus*," *J. Neurosci.* 15(11)1747-7755 (Nov. 1995).

Chen, J., et al., "A Microsphere-Based Assay for Multiplexed Single Nucleotide Polymorphism Analysis Using Single Base Chain Extension," *Genome Res.* 10(4):549-557 (Apr. 2000).

Chiavaroli, C., et al., "Simultaneous Monitoring of Cystosolic Free Calcium and Exocytosis at the Single Cell Level," *J. Neuroendocrinol.* 3(3):253-260 (Mar. 1991).

Clark, R.A., et al., "Electrochemical analysis in picoliter microvials," *Anal. Chem.* 69(2):259-263 (Jan. 1997).

Czarnik, A., "Illuminating the SNP Genomic Code," *Mod. Drug Disc.* 1(2):49-55 (1998).

Danielson, E., et al., "A combinatorial approach to the discovery and optimization of luminescent materials," *Nature* 389(6654):944-948 (Oct. 1997).

DeForest, W.S., *Photoresist Materials and Processes*, McGraw-Hill Book Co.: New York, NY (1975).

Deutsch, M., et al., "Apparatus for high-precision repetitive sequential optical measurement of living cells," *Cytometry* 16(3):214-216 (Jul. 1994).

Dickinson, T., et al., "Generating sensor diversity through combinatorial polymer synthesis," *Anal. Chem.* 69(17):3413-3418 (Sep. 1997).

DiMarco, G., et al., "Luminescent Ru11-polypyridine complexes in poly-2-hydroxyethylmetharcrylate matrices as oxygen sensors,"*Adv. Mater.* 7(5) (1995).

Doyle, R., "High-Temperature Sample Holder for Fast-Atom Bombardment Mass Spectrometry of Molten Materials," *Anal. Chem.* 59(3):537-539 (Feb. 1987).

Drmanac, R., et al., "Prospects for a miniaturized, simplified and frugal human genome project," *Scientia Yugoslavica* 16(1-2):97-107 (1990).

Drmanac, R., et al., "Sequencing of megabase plus DNA by hybridization: theory of the method," *Genomics* 4(2):114-128 (Feb. 1989).

Drmanac, R., et al., "Sequencing by Hybridization (SBH) with Oligonucleotide Probes as an Integral Approach for the Analysis of Complex Genomes," *Intl. J. Gen. Res.* 1(1):59-79 (1992).

Drmanac, R., et al., "Sequencing by Hybridization," *Automated DNA Sequencing and Analysis*, M. Adams et al. (eds.) (1994).

Drmanac, R., et al., "Sequencing by Oligonucleotide Hybridization: A Promising Framework in Decoding of the Genome Program," *The 1st Intl. Conf. Electrophoresis Supercomputing and the Human Genome*, Proceeding of the Apr. 10-13, 1990 Conference, Florida State University (Cantor, C., and Lim, H., eds).

Egner, B.J., et al., "Tagging in combinatorial chemistry: the use of coloured and fluorescent beads," *Chem. Commun.* 8:735-736 (1997).

Fan, J.B., et al., "Parallel genotyping of human SNPs using generic high-density oligonucleotide tag arrays," *Genome Res.* 10(6):853-860 (Jun. 2000).

Ferguson, J.A., et al., "A fiber-optic DNA biosensor microarray for the analysis of gene expression," *Nat. Biotechnol.* 14(12):1681-1684 (Dec. 1996).

Fodor, S., et al., "Light-directed, spatially addressable parallel chemical synthesis," *Science* 251(4995):767-773 (Feb. 1991).

Freeman, T., et al., "Oxygen probe based on tetrakis(alkylamino)ethylene-Chemiluminescence," *Anal. Chem.* 53(1):98-102 (Jan. 1981).

Fuh, M., "Single Fibre Optic Fluorescence pH Probe," *Analyst* 1120:1159-1163 (1987).

Gauci, M.R., et al., "Observation of Single-Cell Fluorescence Spectra in Laser Flow Cytometry," *Cytometry* 25(4):388-393 (Dec. 1996).

Gerry, N.P., et al., "Universal DNA microarray method for multiplex detection of low abundance point mutations," *J. Mol. Biol.* 292(2):251-262 (Sep. 1999).

Grate, J., et al., "Method for estimating polymer-coated acoustic wave vapor sensor responses," *Anal. Chem.* 67(13):2162-2169 (Jul. 1995).

Grate, J., et al., "Solubility properties of siloxane polymers for chemical sensors," *Proc. SPIE* 2574:71-77 (1995).

Grime, G.W., "Holographic Diffraction Gratings Recorded in Photoresist," *Non-Silver Photographic Processes, Proc. Symp. Non-Silver. Photogr. Processes*, Oxford College: Oxford, GB, pp. 275-284 (Sep. 1973).

Gunderson, K.L., "Mutation detection by ligation to complete n-mer DNA arrays," *Genome Res.* 8(11):1142-1153 (Nov. 1998).

Hafeman, D.G., et al., "Light-addressable potentiometric sensor for biochemical systems," *Science* 240(4856):1182-1184 (May 1988).

Healey, B., et al., "Improved fiber-optic chemical sensor for penicillin," *Anal. Chem.* 67(24):4471-4476 (Dec. 1995).

Hirschfeld, T., et al., "Laser Fiber-Optic 'Optrode' for Real Time In Vivo Blood Carbon Dioxide Level Monitoring," *J. Lightwave Technol.* LT-5(7):1027-1033 (1987).

Hirschhorn, J.N., et al., "SBE-TAGS: an array-based method for efficient single-nucleotide polymorphism genotyping," *Proc. Natl. Acad. Sci. USA* 97(22):12164-12169 (Oct. 2000).

Hogan, B.L., et at., "Single-cell analysis at the level of a single human erythrocyte," *Trends Anal. Chem.* 12(1):4-9 (1993).

Hsuih, T., et al., "Novel, ligation-dependent PCR assay for detection of hepatitis C virus in serum," *J. Clin. Microbiol.* 34(3):501-507 (Mar. 1996).

Huang, L., et al., "Exploring single-cell dynamics using chemically-modified microelectrodes," *Trends Anal. Chem.* 14(4):158-164 (1995).

Hubert, C., et al., "Design of solvatochromic polymer-based fiber optics chemical sensor for polar solvent detection," *Adv. Mater.* 7(11):914-917 (1995).

Hughes, K.D., et al., "Fluorescence Imaging of Whole Microorganisms with Scientific Grade CCDS," *Royal Soc. Chem.* (GB) 194:184-189 (1996).

Hughes, K.D., et al., "New Fluorescence Tools for Investigating Enzyme Activity," *Anal. Chim. Acta* 307:393-402 (1995).

Ince, C., et al., "A micro-perfusion chamber for single-cell fluorescence measurements," *J. Immunol. Meth.* 128(2):227-234 (Apr. 1990).

Jacobs, J., et al., "Combinatorial chemistry—applications of light-directed chemical synthesis," *Trends Biotechnol.* 12(1):19-26 (Jan. 1994).

Koop, A., et al., "Continuous bioluminescent monitoring of cytoplasmic ATP in single isolated rat hepatocytes during metaboli poisoning," *Biochem. J.* 295(Pt. 1):165-170 (Oct. 1993).

Lam, K.S., "The 'one-bead-one-compound' combinatorial library method," *Chem. Rev.* 97(2):411-448 (Apr. 1997).

Levy, U., et al., "Direct picture transmission in a single optical fiber with holographic filters," *Optics Commun.* 30(2):163-165 (1979).

Lin, V.S., et al., "A porous silicon-based optical interferometric bionsensor," *Science* 278(5339):840-843 (Oct. 1997).

Lin, Z., et al., "Multiplex genotype determination at a large number of gene loci," *Proc. Natl. Acad. Sci. USA* 93(6):2582-2587 (Mar. 1996).

Lippitsch, M., et al., "Fibre-optic oxygen sensor with the fluorescence decay time as the information center," *Anal. Chim. Acta* 205():1-6 (1998).

Lizardi, P., et al., "Mutation detection and single-molecule counting using isothermal rolling-circle amplification," *Nat. Genet.* 19(3):225-232 (Jul. 1998).

Lonergan, M.C., "Array-based vapor sensing using chemically sensitive, polymer composite resistors," *Conf. Proc., IEEE Aerospace Appl.* 3(8):583-631 (1997).

Lundström, I., et al., "Why bother about gas-sensitive field-effect devices?" *Sens. Actuators* ():75-82 (1996).

Luong, J.H.T., et al., "Fluorescence Sensors for Monitoring Bioprocesses," *Practical Fluorescence*, 2$^{nd}$ ed., G.G. Guibault (ed.), 775-793, Marcel Dekker & Co.: New York, NY: (1990).

Matthews, J., et al., "Analytical strategies for the use of DNA probes," *Anal. Biochem.* 169(1):1-25 (Feb. 1988).

McConnell, H.M., et al., "The Cytocensor Microphysiometer: Biological Applications of Silicon Technology," *Science* 257(5078):1906-1912 (Sep. 1992).

Michael, K., et al., "Fabrication of Micro- and Nanostructures Using Optical Imaging Fibers and Their Use as Chemical Sensors," *Proc. 3rd Intl. Symp., Microstructures Microfabricated Systs.*, (Hersketh, P.J., et al. (eds.), *Electrochem. Soc.* 97(5):152-157 (Aug. 1997).

Michael, K., et al., "Making sensors out of disarray: optical sensors microarrays," *Proc. SPIE* 3270:34-41 (1998).

Michael, K., et al., "Randomly ordered addressable high-density optical sensor arrays," *Anal. Chem.* 70(7):1242-1248 (Apr. 1998).

Mignani, A.G., et al., "In vivo biomedical monitoring by fiber-optic systems," *J. Lightwave Technol.* 13(7):1396-1406 (1995).

Milanovich, F., et al., "Clinical measurements using fiber optics and optrodes," *SPIE* 494:1831 (1984).

Miyawaki, A., et al., "Fluorescent Indicators for Ca2+ based on green fluorescent proteins and calmodulin," *Nature* 388(6645):882-887 (Aug. 1997).

Mrksich, M., et al., "Controlling cell attachment of contoured surfaces with self-assembled monolayers of alkanethiolates on gold," *Proc. Natl. Acad. Sci. USA* 93(20):10775-10778 (Oct. 1996).

Munkholm, C., et al., "Polymer modification of fiber optic sensors as a method of enhancing fluorescence signal for pH measurement," *Anal. Chem.* 58(7):1427-1430 (Jun. 1986).

Normie, L., "System Uses Photonics for Early Tumor Detection," *Biophotonics Intl.* 24-25 (Sep./Oct. 1996).

Owicki, J.C., et al., "Bioassays with a microphysiometer," *Nature* 344(6263):271-272 (Mar. 1990).

Owicki, J.C., et al., "Continuous monitoring of receptor-mediated changes in the metabolic rates of living cells," *Proc. Natl. Acad. Sci. USA* 87(10):4007-4011 (May 1990).

Owicki, J.C., et al., "The Light-Addressable Potentiometric Sensor: Principles and Biological Applications," *Annu. Rev. Biophys. Biomol. Struct.* 23:87-113 (Jun. 1994).

Pantano, P., et al., "Ordered Nanowell Arrays," *Chem. Mater.* 8(12):2832-2835 (1996).

Parce, J.W., et al., "Biosensors for Directly Measuring Cell Affecting Agents," *Annu. Biol. Clin.* (Paris) 48(9):639-641 (1990).

Parce, J.W., et al., "Detection of cell-affecting agents with a silicon biosensor," *Science* 246(4827):243-247 (Oct. 1989).

Park, M., et al., "Block Copolymer Lithography: Periodic Arrays of ~$10^{11}$ Holes in 1 Square Centimeter," *Science* 276(5317):1401-1404 (May 1997).

Peterson, J.I., et al., "Fiber optic pH probe for physiological use," *Anal. Chem.* 52(6):864-869 (May 1980).

Peterson, J.I., et al., "Fiber-optic sensors for biomedical applications," *Science* 224(4645):123-127 (Apr. 1984).

Piunno, P., et al., "Fiber-optic DNA sensor for fluorometric nucleic acid determination," *Anal. Chem.* 67(15):2635-2643 (Aug. 1995).

Plunkett, M., et al., "Combinatorial chemistry and new drugs," *Sci. Am.* 276(4):69-73 (Apr. 1997).

Pope, E., "Fiber optic chemical microsensors employing optically active silica microspheres," *SPIE Proc.* 2388():245-256 (1995).

Rahmani, H., et al., "Adaptation of the Cellscan Technique for the SCM Test in Breast Cancer," *Eur. J. Cancer* 32A(10):1758-1765 (Sep. 1996).

Ramanathan, S., et al., "Sensing antimonite and arsenite at the subattomole level with genetically engineered bioluminescent bacteria," *Anal. Chem.* 69(16):3380-3384 (Aug. 1997).

Rapp, M., et al., "Development of an analytical microsystems for organic gas detection based on surface acoustic wave resonators," *Fresenius J. Anal. Chem.* 352(7):699-704 (1995).

Regnier, F.E., et al., "Electrophoretically-mediated microanalysis (EMMA)," *Trends Anal. Chem.* 14(4):177-181 (1995).

Rosenzweig, Z., et al., "Analytical properties of miniaturized oxygen and glucose fiber optic sensors," *Sens. Actuators* B(35-36):475-483 (1996).

Saari, L., et al., "pH sensor based on immobilized fluoresceinamine," *Anal. Chem.* 54(4):821-823 (Apr. 1982).

Schwab, S., et al., "Versatile, Efficient Raman Sampling with Fiber Optics," *Anal. Chem.* 56(12):2199-2204 (Oct. 1984).

Seitz, W.R., "Chemical sensors based on fiber optics," *Anal. Chem.* 56(1):16A-34A (Jan. 1984).

Shear, J.B., et al., "Single cells as biosensors for chemical separations," *Science* 267(5194):74-77 (Jan. 1995).

Shoemaker, D., et al., "Quantitative phenotypic analysis of yeast deletion mutants using a highly parallel molecular bar-coding strategy," *Nat. Genet.* 14(4):450-456 (Dec. 1996).

Still, W.C., "Discovery of the sequence-selective peptide binding by synthetic receptors using encoded combinatorial libraries," *Acc. Chem. Res.* 29(3):155-163 (Mar. 1996).

Strachan, N., et al., "A rapid general method for the identification of PCR products using a fibre-optic biosensor and its application to the detection of Listeria," *Lett. Appl. Microbiol.* 21(1):5-9 (Jul. 1995).

Syvänen, A., et al., "Detection of point mutations in human genes by the solid-phase minisequencing method," *Clin. Chim. Acta* 226(2):225-236 (May 1994).

Tong, W., et al., "Monitoring single-cell pharmacokinetics by capillary electrophoresis and laser-induced native fluorescence," *J. Chromatogr. B* 689(2):321-325 (Feb. 1997).

Tsien, R.Y., "Fluorescent Probes of Cell Signaling," *Annu. Rev. Neurosci.* 12():227-253 (1989).

Venton, D., et al., "Screening combinatorial libraries," *Chemometrics and Intelligent Laboratory Systems*, pp. 131-150, Elsevier Science Publishers: Amsterdam, NL (1999).

Vergne, I., et al., "Phagosomal pH determination by duel fluorescence flow cytometry," *Anal. Biochem.* 255(1):127-132 (Jan. 1998).

Walt, D., "Fiber Optic Imaging Sensors," *Acc. Chem. Res.* 31(5):267-278 (1998).

Walt, D., "Fiber-optic sensors for continuous clinical monitoring," *Proc. IEEE* 80(6):903-911 (1992).

Walt, D., et al., "Design, Preparation, and Applications of Fiber-Optic Chemical Sensors for Continuous Monitoring," *Chemical Sensors and Microinstumentation, Amer. Chem. Soc. Symp.* 403:252-272 (1989).

White, J., et al., "Rapid analyte recognition in a device based on optical sensors and the olfactory system," *Anal. Chem.* 68(13):2191-2201 (Jul. 1996).

Wightman, R.M., et al., "Temporally resolved catechollamines spikes correspond to single vesicle release from individual chromaffin," *Proc. Natl. Acad. Sci. USA* 88(23):10754-10758 (Dec. 1991).

Wolfbeis, O.S., "Fiber Optical Fluorosensors in Analytical and Clinical Chemistry," *Molecular Luminescence Spectroscopy, Methods and Applications*, Schulman (ed.), Wiley & Sons: New York, NY (1988).

Wolfbeis, O.S., et al., "Fiber-optic fluorosensor for oxygen and carbon dioxide," *Anal. Chem.* 60(19):2028-2030 (Oct. 1988).

Wong, K., et al., "Simultaneous monitoring of gluthathione and major proteins in single erythrocytes," *Mikrochim. Acta* 120:321-327 (1995).

Xiang, X., et al., "A combinatorial approach to materials discovery," *Science* 269(5218):1738-1740 (Jun. 1995).

Yeung, E.S., "Chemical Analysis of Single Human Erythrocytes," *Acc. Chem. Res.* 27:409-414 (1994).

Zare, R.N., "Making a Biosensor from a Cell and a Fluorescent Dye," *Biophotonics Intl.* 3:17 (Mar./Apr. 1995).

Zellers, E., et al., "Optimal coating selection for the analysis of organic vapor mixtures with polymer-coated surface acoustic wave sensor arrays," *Anal. Chem.* 67(6):1092-1106 (Mar. 1995).

Zhujun, Z., et al., "A Fluorescence Sensor for Quantifying pH in the Range for 6.5 to 8.5," *Anal. Chim. Acta* 160:47-55 (1984).

Zurgil, N., et al., "Intracellular Fluorescence Polarization Measurements with the Cellscan System: Detection of Cellular Activity in Autoimmune Disorders," *Isr. J. Med. Sci.* 33(4):273-279 (Apr. 1997).

* cited by examiner

Oligonucleotide Manufacturing Real Time Monitoring Graphical User Interface

| Machine ID ▼ | Type ▼ | Batch # ▼ | Restarts ▼ | Cycle # ▼ | Total Cycles ▼ | Start Time ▼ | Failures ▼ | Progress ▼ |
|---|---|---|---|---|---|---|---|---|
| Machine #1 | Type 1 | 123456 | 0 | 0 | 0 | Unknown | 0 | 0% |
| Machine #2 | Type 1 | 123457 | 0 | 0 | 0 | Unknown | 0 | 0% |
| ⊞ Machine #3 | Type 2 | 123458 | 1 | 19 | 75 | 2:30 | 9 | 25% |
| ⊞ Machine #4 | Type 2 | 123459 | 0 | 14 | 34 | 3:45 | 200 | 41% |
| ⊞ Machine #5 | Type 2 | 123460 | 0 | 21 | 34 | 4:00 | 1 | 61% |

Oligonucleotide Manufacturing Real Time Monitoring Graphical User Interface

Disconnect

Real Time Mode ▼

Refresh Data

Status: Connected...

*FIG. 7*

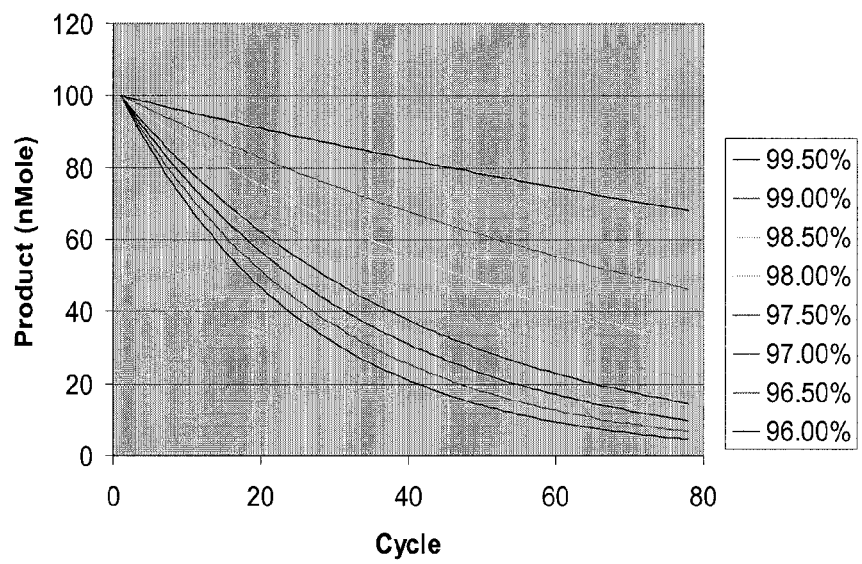
FIG. 8 Yield for diminishing coupling efficiencies
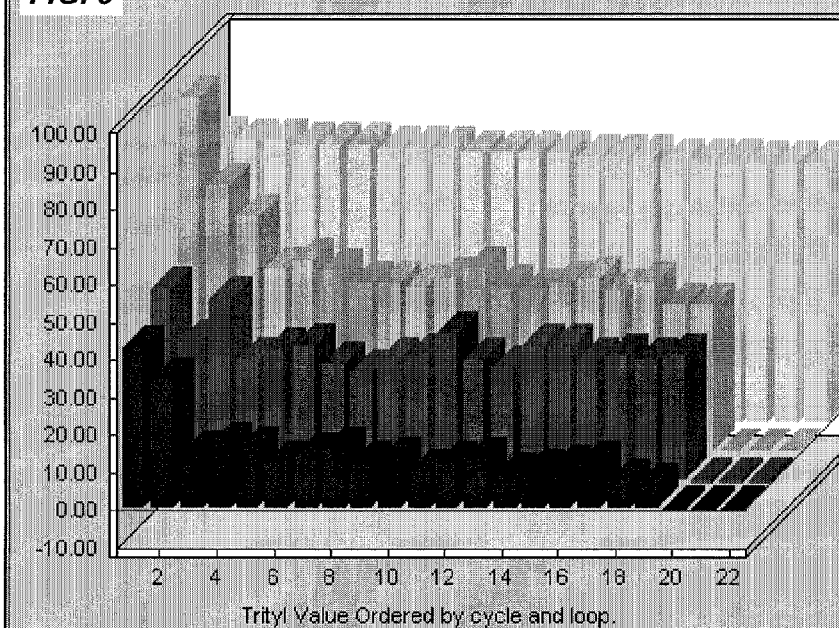
FIG. 9

CHEMICAL REACTION MONITOR

CROSS-REFERENCES TO RELATED APPLICATIONS

This application claims priority to U.S. Provisional Patent Application No. 60/441,752 filed Jan. 21, 2003, entitled CHEMICAL REACTION MONITOR, the entire contents of which is incorporated herein by this reference.

BACKGROUND OF THE INVENTION

1. Field of the Invention

The present invention relates to the field of monitoring chemical reactions. More particularly, the present invention relates to a new and improved chemical reaction monitor for use in monitoring parallel chemical reactions.

The chemical reaction monitor of the present invention is particularly suited for real-time monitoring of oligonucleotide synthesis. The chemical reaction monitor of the present invention is also particularly suited for providing a quality control (QC) measure for oligonucleotide production.

2. Description of Related Art

Oligonucleotide synthesis is a cyclical process that assembles a chain of nucleotides. Nucleotides are added one by one through a cycle of chemical reactions, in which a particular molecule (e.g., a nucleotide) is added to a growing DNA molecule (e.g., a growing DNA chain), sometimes via catalysis, until the desired chain is complete. Generally, each cycle of chemical reactions includes the steps of detritylation, coupling, capping and oxidation.

During the detritylation or "deprotection" step, a dimethoxytrityl (DMT) group is removed from the last nucleotide of the growing DNA chain to allow the addition of the next nucleotide. The amount of DMT released from each cycle is monitored to insure a high coupling efficiency. The release of DMT is apparent because a bright orange color is emitted as DMT is released.

Monitoring of the detritylation or deprotection step in known commercial synthesizers is done in the form of a spectrophotometer monitoring a cuvette through which wash waste is passed. Such monitoring is done on a discrete per sample basis in systems that process as many as 32 oligonucleotide samples simultaneously. During the detritylation step the waste is monitored for the presence and magnitude of the orange color indicating the release of DMT. As the number of simultaneous reactions increases, the ability to use known methods to monitor reaction progress becomes prohibitively inefficient.

What is needed is a chemical reaction monitor that allows parallel monitoring of chemical reactions in which each sample may be observed and monitored both discretely and as a collection. The present invention satisfies this need and provides other advantages as well.

BRIEF SUMMARY OF THE INVENTION

One aspect of the present invention is directed to a chemical reaction monitoring system for parallel monitoring of a plurality of chemical reactions wherein each chemical reaction occurs within a respective one of a plurality of wells. The system includes a lighting device for illuminating the plurality of wells, a camera device configured to obtain a fresh image of the plurality of wells and saving the fresh image to an image storage location, a viewer program for viewing the saved fresh image, and an analyzer program for accessing the saved fresh image, geometrically registering the saved fresh image in order to determine a specific value corresponding to each one of the chemical reactions within each well at the time the image was obtained, and saving the specific values to an analysis results storage location.

A system of the invention can further include optics for directing light from a lighting device to the sample and for directing the light from the sample to the camera.

In one embodiment, the chemical reaction is oligonucleotide synthesis. Thus, the device can be integrated into an oligonucleotide synthesis instrument. The plurality of wells may be located in a multi-well plate.

The lighting device may include a light emitting diode (LED) array. The LED array may have a first array and a second array positioned on either side of a multi-well plate-viewing window. Alternatively, the LED array can include a single array positioned pivotally mounted on one side of a multi-well plate-viewing window.

In one embodiment, the camera device is a charge couple device (CCD) capable of imaging the plurality of wells simultaneously. The camera device can be coupled with imaging optics for simultaneous imaging of a plurality of wells. The analyzer program may process the fresh image and save a corresponding processed image to the analysis results storage location.

The invention further provides a chemical synthesis system. The system may include one or more of the following components: (a) a sample holder placed to support a plurality of wells; (b) a liquid dispenser placed to dispense a liquid sample to the plurality of wells; (c) a liquid removal device placed to remove the liquid sample from the plurality of wells; (d) an automated device for controlling said liquid dispenser or said liquid removal device; (e) a lighting device for illuminating the plurality of wells; (f) a camera device configured to obtain a fresh image of the plurality of wells and save the fresh image to an image storage location; (g) an computer system configured to: (i) access the saved fresh image; (ii) determine a specific value corresponding to each one of the chemical reactions within each well at the time the image was obtained; and (iii) communicate an instruction to the automated device.

Also provided is a chemical synthesis system that may include one or more of the following components: (a) a sample holder placed to support a plurality of wells; (b) a liquid dispenser placed to dispense a liquid sample to the plurality of wells; (c) a liquid removal device placed to remove the liquid sample from the plurality of wells; (d) a lighting device for illuminating the plurality of wells; (e) a camera device configured to obtain a fresh image of the plurality of wells and save the fresh image to an image storage location; and (f) a computer system configured to: (i) access the saved fresh image; (ii) determine a specific value corresponding to each one of the chemical reactions within each well at the time the image was obtained; and (iii) communicate a representation of the specific values to a graphical user interface.

In particular embodiments a liquid dispenser can be placed to independently dispense various liquid samples to the plurality of wells. Thus, different samples can be added to each well. A liquid dispenser can be placed under computer control. Accordingly, commands can be sent from the computer directing the liquid dispenser to dispense liquid, stop dispensing liquid, dispense a particular volume of liquid, or to dispense to a particular well in a plurality of wells being monitored.

Another aspect of the present invention is directed to a method for parallel monitoring of a plurality of chemical reactions, wherein each chemical reaction occurs within a respective one of a plurality of wells. The method includes the steps of illuminating the plurality of wells, and obtaining images of the plurality of wells with a camera device and saving the images to an image storage location, the camera device being capable of imaging the plurality of wells simultaneously.

The method may further include the step of viewing one or more of the saved images. The method may further include the step of analyzing the saved images by opening each saved image and geometrically registering each saved image in order to determine a specific value corresponding to each one of the chemical reactions at the time the image was obtained, and saving the specific values to an analysis results storage location.

The invention further provides a method for synthesizing a plurality of different polymers. The method may include one or more of the following steps: (a) providing a plurality of wells containing support-bound monomeric or oligomeric precursors of the polymers; (b) dispensing second monomeric precursors of the polymers to the plurality of wells under conditions for forming an intermediate in which the support-bound monomeric or oligomeric precursors are bound to the second monomeric precursors; (c) obtaining a fresh image of the plurality of wells and saving the fresh image to an image storage location; (d) executing commands in a computer system to access the saved fresh image, geometrically register the saved fresh image in order to determine a specific value corresponding to each one of the chemical reactions within each well at the time the image was obtained, and save the specific values to an analysis results storage location; and (e) if the specific values are within a pre-defined passing range then repeating steps (a) through (d) and if the specific values are within a pre-defined failing range then preventing repetition of steps (a) through (d) for at least one of the wells in the plurality of wells.

An object of the present invention is to provide a method and apparatus for monitoring parallel chemical reactions in which each one of a plurality of samples may be observed and monitored both discretely and as a collection.

Another object of the present invention is to provide a method of using a camera to allow each one of a plurality of samples to be observed and monitored both discretely and as a collection.

Another object of the present invention is to provide a method of using a single or collection of optical filtering, remote triggering of the camera, remote triggering of an array of photodiodes, other suitable processes, or a combination thereof to allow a measurement of photons of a specific spectral quality using the monitoring apparatus.

The chemical reaction monitor of the present invention has other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 7 is a schematic representation of a graphical user interface of the chemical monitor of FIG. 3 providing an overview of a plurality of networked oligonucleotide synthesizers.

FIG. 8 is a graph of an exemplary exponential decay showing yields as a function of "cycle" based on a fictitious substance and coupling efficiency.

FIG. 9 is a graphical representation of DMT measurements of a well of the multi-well plate taken during an exemplary successful oligonucleotide synthesis as compared to an expected DMT value.

DETAILED DESCRIPTION OF THE INVENTION

Figure 1:
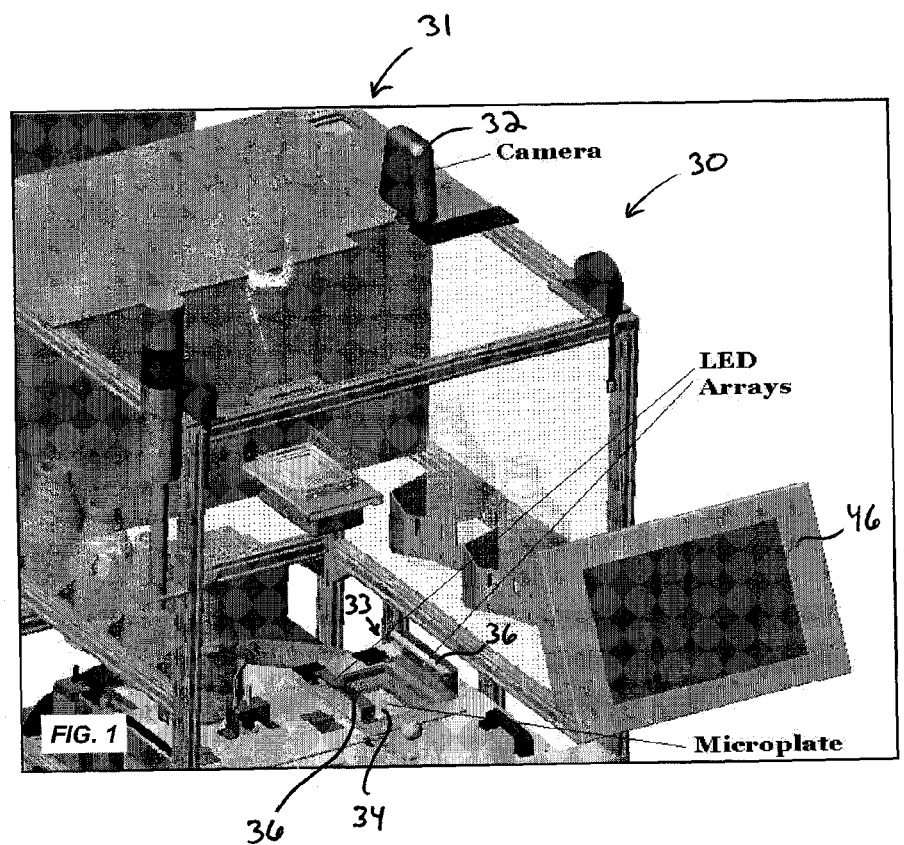
FIG. 1 is a perspective view of a chemical reaction monitor of the present invention including a camera device and a lighting device mounted on an oligonucleotide synthesizer for capturing images of a multi-well plate.

Reference will now be made in detail to the preferred embodiments of the present invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The chemical reaction monitor of the present invention is configured for use in monitoring parallel chemical reactions and is particularly suited for real-time monitoring of polymer synthesis such as oligonucleotide synthesis or peptide synthesis or both. The chemical reaction monitor of the present invention is also particularly suited for providing a quality control (QC) measure for oligonucleotide or peptide production. In one embodiment, the chemical reaction monitor is an automated DMT monitoring system used to track the yield, quality and general state of oligonucleotides (DNA) being synthesized at any one time. Although the present invention is exemplified herein in the context of polynucleotide synthesis one should appreciate that the chemical reaction monitor of the present invention is not limited to oligonucleotide synthesis and may be used in the monitoring of other types of chemical reactions.

A chemical reaction monitor of the present invention can be used to monitor any reaction that produces an optical signal indicative of reaction progress. Accordingly, an optical signal that results directly from a reaction can be monitored. For example as set forth below, the release of optically inactive DMT during deprotection steps of a polynucleotide synthesis can be monitored. In particular embodiments, a reagent can be added to a reaction to react with a product of the reaction thereby changing an optical property of the reaction mixture. For example, a reagent that becomes optically active in the presence of a desired product, modifies a particular product to make the product optically active, reduces optical activity of a desired product, or becomes less optically active in the presence of a desired product can be used. In particular embodiments, polypeptide synthesis can be monitored based on the addition of a monitoring reagent such as bromophenol blue. Methods for peptide synthesis utilizing bromophenol blue to monitor the status of peptide coupling are known as described, for example, in U.S. Pat. No. 5,342,585, entitled APPARATUS FOR MAKING MULTIPLE SYNTHESIS OF PEPTIDES ON SOLID SUPPORT and issued to Lebl et al. on Aug. 30, 1994. Other reagents that can be used in a polypeptide synthesis and used in an apparatus of the invention for simultaneously monitoring a plurality of reactions include, for example, trinitrobenzene sulfonic acid which can be added to a polypeptide reaction or ninhydrin which can be added to an aliquot removed from a peptide reaction in accordance with the Kaiser test kit (Fluka Chemicals, Cat No. 60017).

Any of a variety of known optical properties can be monitored in accordance with the invention including, without limitation, absorbance, fluorescence, chemiluminescence, polarization, circular dichroism, fluorescence resonance energy transfer (FRET), light scattering or the like. Furthermore, those skilled in the art will readily recognize that an optical detection device, such as those set forth herein can be modified or replaced with any of a variety of known detection devices appropriate for monitoring such optical properties. Further still, the invention can be used to detect changes in optical properties that occur in one or more range of the electromagnetic spectrum including, without limitation, infrared, visible, ultraviolet, x-ray, microwave, sub-regions thereof such as red, blue or yellow sub-regions of the visible region, combinations of these regions or subregions, or other regions of the spectrum.

In accordance with the present invention, an oligonucleotide synthesizer is configured to acquire an image of a plurality of wells, such as the wells of a multi-well plate. As used herein the term "multi-well plate" is intended to mean a substrate having a plurality of discrete chambers suitable for holding a liquid. A substrate included in the term can be, for example, molded plastic such as polystyrene or polypropylene. Exemplary multi-well plates include, for example, microplates, microtiter plates or n-well plates where "n" is the number of wells including, for example, 8-, 16-, 96-, 384-, or 1536-wells. As used herein, the term "microplate" is intended to mean a multi-well plate that has dimensions and properties consistent with the definition provided by the Society for Biomolecular Screening (Danbury, Conn., USA). A multi-well plate can have wells with any of a variety of cross-sectional shapes including, for example, cylindrical, square, rectangular, multisided, interlocking shapes wherein the bottom of wells are flat, conical, pointed, or round.

A plurality of wells imaged or processed in accordance with this disclosure can be located in a single substrate or in multiple substrates. In one embodiment each well can be a separate tube occurring in a plurality of tubes. Such tubes can occur at fixed locations in a holder or substrate or can be moveable such that one or more of the tubes changes relative location with respect to another tube in the plurality.

The apparatus and methods set forth herein can be used to monitor large pluralities of reactions simultaneously including, for example, at least 96, 100, 384, 500, 1000, 1536, 2000, 3000, 4000, 5000, 10,000, 100,000 or more reactions. The reactions can occur simultaneously such that all are in the same stage of a reaction cycle or, alternatively, reactions proceeding through different stages of a reaction cycle can be monitored. Furthermore, different types of reactions can be simultaneously monitored. For example, an apparatus or method of the invention can be used to simultaneously monitor synthesis of a plurality of peptides and a plurality of polynucleotides.

An apparatus of the invention can be configured to acquire an image during any step of synthesis including, but not limited to, wash cycles, coupling cycles, capping cycles and oxidation cycles. One will appreciate that image acquisition may be useful in debugging machine or software issues and for other technical means. Image acquisition is particularly suited for obtaining images of the wells of a multi-well plate during the deprotection step in order to determine DMT intensity.

Generally, an image is acquired, uniquely named and sent as a "fresh" or unprocessed image file to an image storage location. Upon arrival at the storage location, an analyzer program can process the fresh image file. For example, upon detecting a fresh image, the analyzer program can open the image, register the relative position of the multi-well plate to mitigate positional errors, and extract an optical intensity value from each well of the multi-well plate. Upon completion, the analyzer program can write the optical intensity data to an analysis results storage location. The process image file may be renamed to indicate that the image has been processed. In accordance with the present invention, this process may take place in as little as approximately 8 seconds thus allowing the analyzer program to populate the analysis results database with near real-time data. An apparatus or method of the invention generally includes a computer system such as those based on INTEL® microprocessors and running MICROSOFT WINDOWS® operating systems. Other systems such as those using the UNIX® or LINUX® operating system and based on IBM®, DEC® or MOTOROLA® microprocessors are also contemplated. The systems and methods described herein can also be implemented to run on client-server systems and wide-area networks such as the Internet.

As used herein the term "storage location" is intended to mean a computer readable memory. Exemplary forms of computer readable memory include, but are not limited to, a database, hard disk, floppy disc, compact disc, magneto-optical disc, Random Access Memory, Read Only Memory or Flash Memory. The memory or computer readable medium used in the invention can be contained within a single computer or distributed in a network. A network can be any of a number of conventional network systems known in the art such as a local area network (LAN) or a wide area network (WAN). Client-server environments, database servers and networks that can be used in the invention are well known in the art. For example, the database server can run on an operating system such as UNIX®, running a relational database management system, a World Wide Web application or a World Wide Web server. Other types of memories and computer readable media are also contemplated to function within the scope of the invention.

Data stored at a storage location can be in any of a variety of forms known in the art including, for example, a text file, .xml file, .jpg file, TIFF file, or BMP file. Software to implement a method of the invention can be written in any well-known computer language, such as Java, C. C++, Visual Basic, FORTRAN or COBOL and compiled using any well-known compatible compiler. The software of the invention normally runs from instructions stored in a memory on a host computer system. A database or data structure of the invention can be represented in a markup language format including, for example, standard generalized markup language (SGML), hypertext markup language (HTML) or extensible markup language (XML).

A computer system useful in the invention can further include a laboratory management system (LIMS). A LIMS system can contain information relating to the sequence of a polymer to be synthesized as information about manipulations that have been and are to be carried out on the polymer. The entire sequence information regarding the synthesis of a polymer can be copied from LIMS into the analysis results storage location for quick, native retrieval by a technician or other authorized personnel. This can provide the advantage of minimizing the calls to LIMS to just one per synthesis.

The chemical reaction monitor of the present invention generally includes a hardware component and a software component. The hardware component captures images of a plurality of wells of a multi-well plate containing samples in which chemical reactions occur. The software component can be subdivided into a storage subcomponent, an analyzer subcomponent, an analysis results and a viewing subcomponent.

In one embodiment shown in FIG. 1, a chemical reaction monitor 30 includes a hardware component mounted on an oligonucleotide synthesizer system 31 of the type including, but not limited to the OLIGATOR® DNA synthesis platform, developed by Illumina, Inc. of San Diego, Calif. Similarly, the hardware component may be mounted on oligonucleotide synthesizers such as, but not limited to, those disclosed by U.S. patent application Ser. No. 09/881,052, filed Jun. 13, 2001, entitled OLIGONUCLEOTIDE SYNTHESIZER, and now U.S. Pat. No. 6,663,832, the entire contents of which is incorporated herein by this reference. Other polymer synthesizers useful in the invention are described in U.S. Pat. Nos. 5,338,831 and 6,121,054 and WO 00/44491, the entire contents of which patents are incorporated herein by this reference. Reagents can be dispensed to wells and removed by centrifugation as described in the above patent and patent application. Polymer precursors including, but not limited to, monomeric and oligomeric precursors can be attached to wells or other solid phase supports using methods known in the art as described for example in the above patent and patent application.

One should appreciate that the hardware component or the software components of the present invention or both may be used in combination with other systems in which multiple chemical reactions occur in parallel. Thus, reagents can be dispensed, manipulated, and removed from wells using methods utilized in synthesizers from Applied Biosystems, Perkin Elmer and other commercial vendors. Furthermore, several chemical synthesizers, each having appropriate hardware components such as those set forth herein, can be networked for communication with a centralized software component such that multiple instruments can be monitored.

Chemical reaction monitor 30 can include a hardware component having a computer accessible camera device 32, a lighting device 33 and a client server based software component for controlling the camera device and/or the lighting device. The camera device and the lighting device facilitate capturing an image of a multi-well plate 34, including a plurality of wells 35 located therein, during specific points of a chemical synthesis process.

Figure 2:
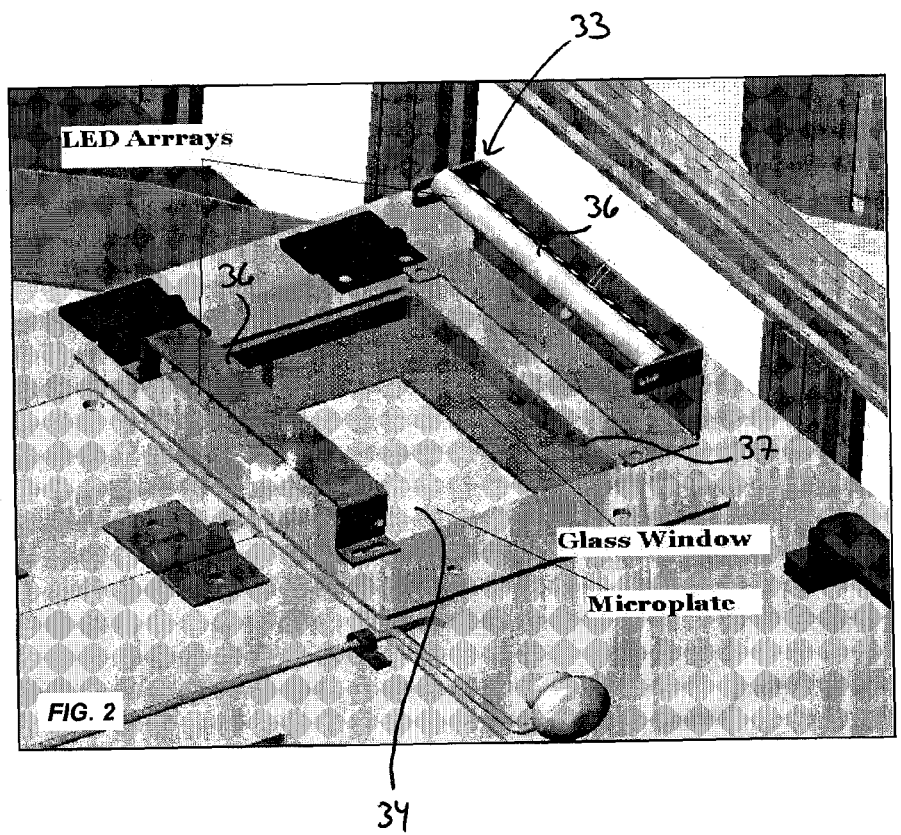
FIG. 2 is an enlarged perspective view of the lighting device of FIG. 1.

The lighting device is positioned in a manner to illuminate a multi-well plate of a synthesizer apparatus and the wells thereof, for example, as shown in FIG. 2 for an oligonucleotide synthesizer. Any lighting source that allows wells to be photographed, captured as an image, or otherwise evaluated to determine optical properties can be used in the invention. Typically, a lighting device provides homogeneous illumination to all wells being monitored. A lighting device can also be selected to transmit light of a particular range of wavelengths including, for example, visible, ultraviolet, infrared, sub-ranges thereof such as red, blue or yellow sub-ranges within the visible range, or combinations of these ranges or sub-ranges.

In particular embodiments, the lighting device includes a light emitting diode (LED) array 36 arranged adjacent the multi-well plate. A cold DC power source may be utilized to power the LED array. Advantageously, the DC power to each LED or the mechanical position of the various LEDs can be independently controlled to optimize the imaging of the camera. The DC/LED configuration of the present invention can be used to minimize and/or prevents dark or dim images. In particular embodiments, other forms of lighting such as incandescent or fluorescent lighting can be used. Those skilled in the art will know or be able to determine appropriate illuminating, optical manipulation and imaging configurations to provide a sufficiently homogeneous illumination for monitoring a chemical reaction occurring in a plurality of wells.

As shown in FIG. 2, two opposing LED arrays can be provided on either side of an aperture or rectangular plate glass window 37, which window provides a view of the multi-well plate beneath the glass window. In one embodiment, one LED array may be positioned slightly higher than the other. Typically, the LED arrays are positioned out of field of view of the camera.

One should appreciate that the LED array may vary in accordance with the present invention. For example, one, two, three or more LED arrays may be used. Furthermore, the LED arrays may be configured to utilize different wavelengths, diffusion patterns, voltages, etc. in order to influence the imaging of the camera, for example, improving the usefulness of data captured for a particular reaction being monitored.

Other lighting devices that can be used include, for example, one or more lamps, lasers or bulbs. Such devices are typically selected to provide homogeneous illumination to a plurality of wells being monitored. However, in embodiments in which the light source itself is not homogeneous a diffuser module can be used to provide homogenous lighting conditions to wells being monitored. One or more lenses can also be used in combination to provide homogeneous illumination.

If desired the wavelength of light that contacts wells to be monitored can be provided by a particular combination of light source and optical filters. An optical filter useful in the invention can be any device for selectively passing or rejecting passage of radiation in a wavelength, polarization or frequency dependent manner. Exemplary filters include an interference filter in which multiple layers of dielectric materials pass or reflect radiation according to constructive or destructive interference between reflections from the various layers. Interference filters are also referred to in the art as dichroic filters, or dielectric filters. The term can include an absorptive filter which prevents passage of radiation having a selective wavelength or wavelength range by absorption. Absorptive filters include, for example, colored glass or liquid. Those skilled in the art will know or be able to determine an appropriate combination of light source and optical filters to produce illumination in a desired wavelength range.

Beam splitters, lenses, or other devices for changing the path of illumination can be used in an apparatus of the invention. Beam splitters, lenses and their properties are known in the art and can be obtained from commercial sources including, for example, Melles Griot (Irvine, Calif.), or Oriel Corp. (Stratford, Conn.). In particular embodiments, a beam splitter can be used for perpendicular illumination and viewing a multi-well plate or other plurality of wells. Thus, optical components can be arranged differently from the arrangements exemplified herein while providing illumination properties similar to those described herein. Accordingly, an apparatus of the invention can be configured for compact or modular placement suitable for a variety of laboratory environments.

If desired, a mask can be used in an apparatus of the invention to preferentially illuminate one or more wells in a multi-well plate or other plurality of vessels. For example, a mask can be placed to selectively illuminate wells of a multi-well plate compared to regions between the wells to prevent unwanted light scatter or to enhance contrast of images and ease registration of images obtained from the multi-well plate.

In particular embodiments, the intensity of each LED in an LED array can be independently controlled. For example, each LED intensity to be controlled by a manual adjustment such as adjustment with a potentiometer. Such control over the LED intensity can also be achieved programmatically, for example, via a networked GUI or computer system. An advantage of computer controlled illuminator electronics is that lighting intensity for all or part of the LED array can be changed remotely via software. Thus, an individual user can interact with a GUI to send commands that alter intensity of one or more LED in an array. A further advantage is that illumination intensity can be controlled by a feedback loop in which one or more properties of the illumination are monitored, automatically compared by a computer algorithm to expected ranges for the one or more properties and intensity of one or more LEDs automatically adjusted in accordance with commands sent by the computer algorithm. Thus, a user need not intervene and properties such as LED intensity, homogeneity of the field of light or color of illumination can be adjusted in an automated fashion. Such properties can be determined using an image analyzer such as those described below in further detail.

In one embodiment, camera device 32 is a charge couple device (CCD) camera of the type including, but not limited to, the AXIS 2100 Network Camera provided by AXIS Communications, Inc. of Lund Sweden. One should appreciate that other types of cameras may be used in accordance with the present invention. A camera used in the invention can be any device that converts a detectable optical property into a signal in a location dependent manner. Thus, exemplary cameras useful in the invention include, for example, complementary metal oxide semiconductor (CMOS) camera, video camera, internet camera, and other imaging devices capable of converting a picture into a digital image. A camera device of the invention can be functionally connected to a computer such that a digital image or other data indicative of a signal detected by the camera can be communicated to the computer for further storage or processing or both. The camera device can include a built-in microprocessor for example, in one embodiment, the camera includes a built-in LINUX device and web server. Such configuration allows the camera device to be connected directly to the central network and be configured to store images in a designated image location on the central network. Camera modules discussed here incorporate imaging optics, photon detection devices, digitizing electronics, and electronic communication capability. These tasks can also be accomplished with separate components as opposed to an integrated camera module.

A camera device can be positioned on a chemical synthesizer over a multi-well plate or other plurality of wells such that it is capable of obtaining an image which includes all of the wells, as is shown in FIG. 1 for an oligonucleotide synthesizer. The multi-well plate generally includes 96 or 384 wells, however, one should appreciate that the multi-well plate may include more than 384 wells. Advantageously, the camera device not only allows observation of the multi-well plate as a whole, but also allows observation of each well individually. A camera device can incorporate an optical filtering stage rendering the detector capable of spectral measurements and tunable to specific chemicals that exhibit specific absorptivities in spectrum. Exemplary optical filters that can be used to filter light entering the camera include, without limitation, those set forth above with respect to lighting devices. An optical filter used for a camera device can match the emission of a particular lighting device in order to create a powerful absorption measurement in reflection mode and for selective detection of desired signals in a well to be detected or selective rejection of unwanted background signals. An RGB (Red, Green, Blue) camera device can also be used instead of a single color device. As with other cameras described herein, an RGB camera can be used without an optical filter if desired.

Figure 3:
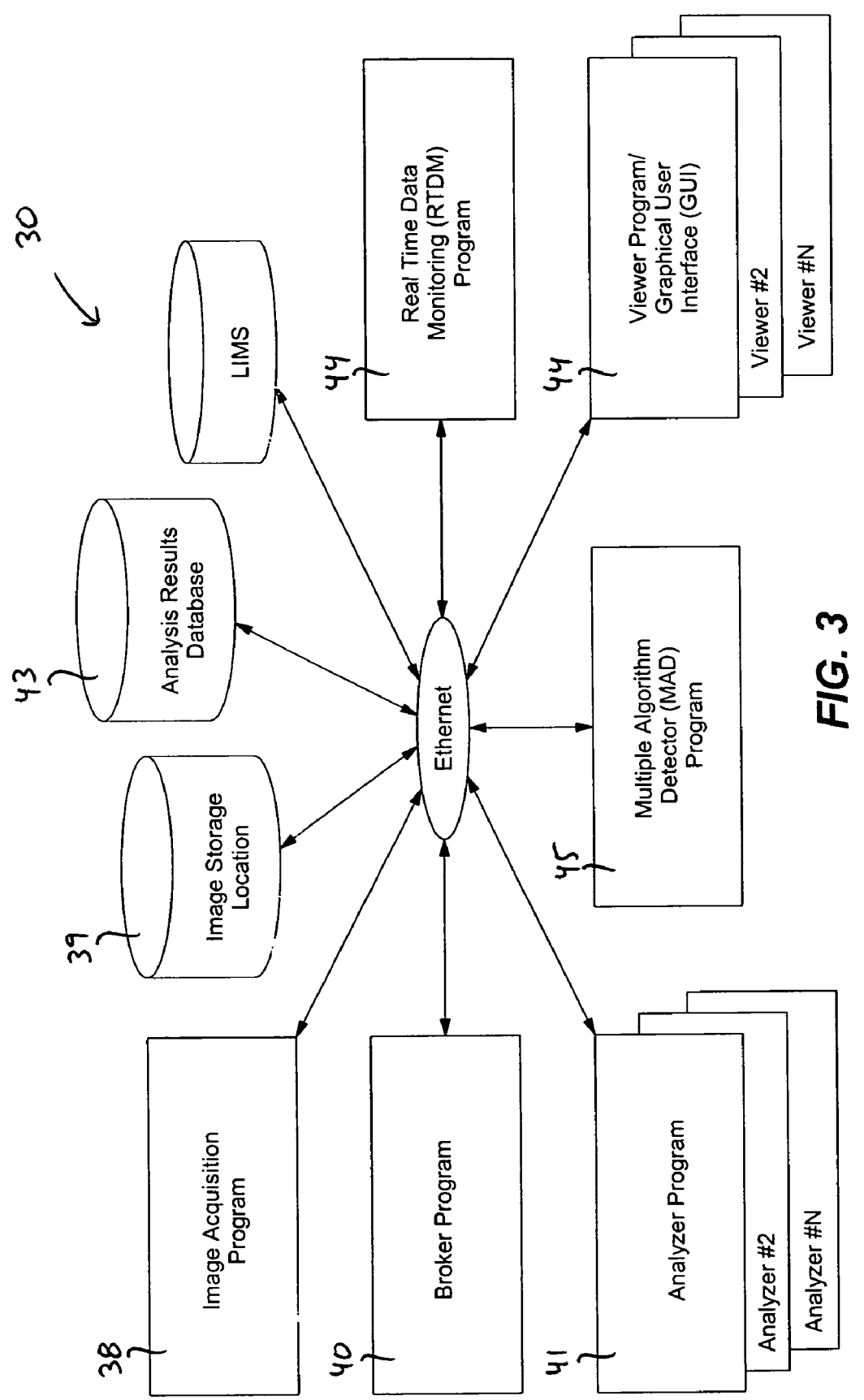
FIG. 3 is a schematic view of a chemical reaction monitor in accordance with the present invention utilizing the chemical reaction monitor of FIG. 1.

A camera device useful in the invention can include an internal camera microprocessor having an image acquisition program 38 that can be signaled to take an image and transfer the image electronically to a storage location such as a central network file repository or image storage location 39 on the central network shown in FIG. 3. The image storage location can be a path location on the network. The image storage location is not machine specific and may be provided on different platforms including, but not limited to LINUX®, WINDOWS®, and other suitable operating systems such as those set forth herein previously. The storage location can be dynamically configurable by each of the chemical reaction monitor's components, so if a problem occurs all subcomponents of the software component can be pointed to a different location with minimal effort.

In the exemplary embodiment shown in FIG. 3, the oligonucleotide synthesizer system is configured to control the camera device. For example, OLIGATOR® control software may be configured to signal the camera device, via the central network, when to take an image of a multi-well plate of the oligonucleotide synthesizer. The image may be transferred to the image storage location (see FIG. 3) in the form of a JPEG, TIFF, BMP file or other suitable file format.

In particular embodiments, the image files are named according to batch number, plate number, cycle number and loop number within the synthesis protocol that the synthesis process is at when the image is taken. In this respect, the term "cycle" refers to the complete cycle of steps for the addition of each base to the growing DNA chain, including the deprotection, coupling, capping, and oxidation steps. The term "loop" refers to an operation that is performed several times within the same cycle. For example, the deprotection step may repeat two or three times within the same cycle whereby a "loop" designation may be used to differentiate the particular deprotection operation within a cycle.

Turning now to FIG. 3, which figure illustrates an exemplary software component of chemical reaction monitor 30 in accordance with the present invention, separate software subcomponents or programs can be provided to independently or autonomously store, analyze, and view the images. For example, the camera device may include means such as image acquisition program 38 to autonomously send images to image storage location 39 on the central network. Similarly, the various subcomponents including, but not limited to, the broker, analyzer, viewer, multiple analogue and/or real-time data management programs described below may be separate and discrete from one another in order to remove dependencies. The network architecture of FIG. 3 is exemplary and those skilled in the art will recognize that a variety of other architectures and modifications of the exemplified architecture can be used to produce a chemical reaction monitoring system having the properties set forth herein.

An autonomous computer system configuration provides independence that allows images to be obtained and/or viewed without overburdening resources necessary for image analysis. This also allows individual development of the different subcomponents in different languages and/or platforms, by different engineers. Such autonomy also allows any one of the many subcomponents to be taken offline, causing at most, the other subcomponents to patiently wait for the offline subcomponent to return to service, as opposed to a major system shut down. Thus, if one of the imaging, analyzing, or viewing subcomponents malfunction, the malfunction will not affect the remaining programs. For example, if the viewer program crashes, the discrete camera imaging software still allows the camera to continue capturing and storing images, which images may continue to be analyzed and, once the viewer program is again running, allow one to again view the stored images.

In one embodiment, when a synthesis starts, and in particular, when a de-protection step is encountered, an image is taken of the multi-well plate (see FIG. 6) and sent to the image storage location. The image storage location may be local or it can reside at a particular centralized network address. A broker program 40 can be configured to constantly observe the image storage location for new images. For example, the broker program can constantly observe the image storage location and define images as being "new" merely by their presence in this location, and by having a specific file extension, for example ".jpg" in the case of JPEG images, and/or other suitable image format extensions. The broker program can build a list of new image file names every time the queue is empty.

A broker program, replete with an internal queue of unique image filenames, can reside at an IP address on a network and can assign a unique file name to each new image. A filename can encode information that is specific to a particular synthesis and step of the synthesis, such as the plate, the batch, the cycle, loop, machine name, etc.

A separate analyzer program 41 can be responsible for processing stored images. The analyzer program can run in the background autonomously and independent of the image storage program and other programs of the software component.

The analyzer program can scan for fresh images, that is, unprocessed or to-be-analyzed images, through a broker program. Once the analyzer program gets the filename of a fresh image, it can retrieve the file from the network location and perform image analysis. The analyzer program can individually open each image stored in the image storage location (see FIG. 3), register the image geometrically, then sample specific regions of the image for specific values that relate to the magnitude of the hue, saturation and luminance of the bright orange color which is emitted as DMT is released during the deprotection step of oligonucleotide synthesis. The specific regions of the image sampled can correspond to each well of the multi-well plate that has been imaged or photographed. Typically, the specific regions correspond to the center of each well. However, if desired any part of each well can be correlated with specific regions of the image.

The analyzer program can analyzes one or more optical property, such as DMT intensity, for every well in a multi-well plate, extract the intensity value and store the intensity value in memory. For example, the specific values which relate to the magnitude of the hue, saturation and luminance of each well of the image can determined and stored. Once in memory, the values for a particular optical property can be formed into a structured query language (SQL) statement and appended to an SQL database or analysis results database. After the database update is complete, the analyzer program can move the file to a new "processed" location and changes the extension of the filename, for example, from ".jpg" to ".jpr" to indicate in a human-readable form that the image has indeed been processed.

At this point, the analyzer program may request another image from the queue. The analysis or processing cycle for each image typically takes less than approximately 10 to 20 seconds and can be about 8 seconds or less. The chemical reaction monitor may be provided with multiple copies of the analyzer program, running from different personal computers throughout a company's network. For example, 1, 2, 3 or more analyzer programs may simultaneously connect to the network and simultaneously analyze different images. Thus, as workload (e.g., the number of images to be analyzed) increases, additional analyzer programs can be started to ensure that the rate of analysis meets or exceeds a desired rate of image generation to ensure that throughput demands are met.

Figure 6:
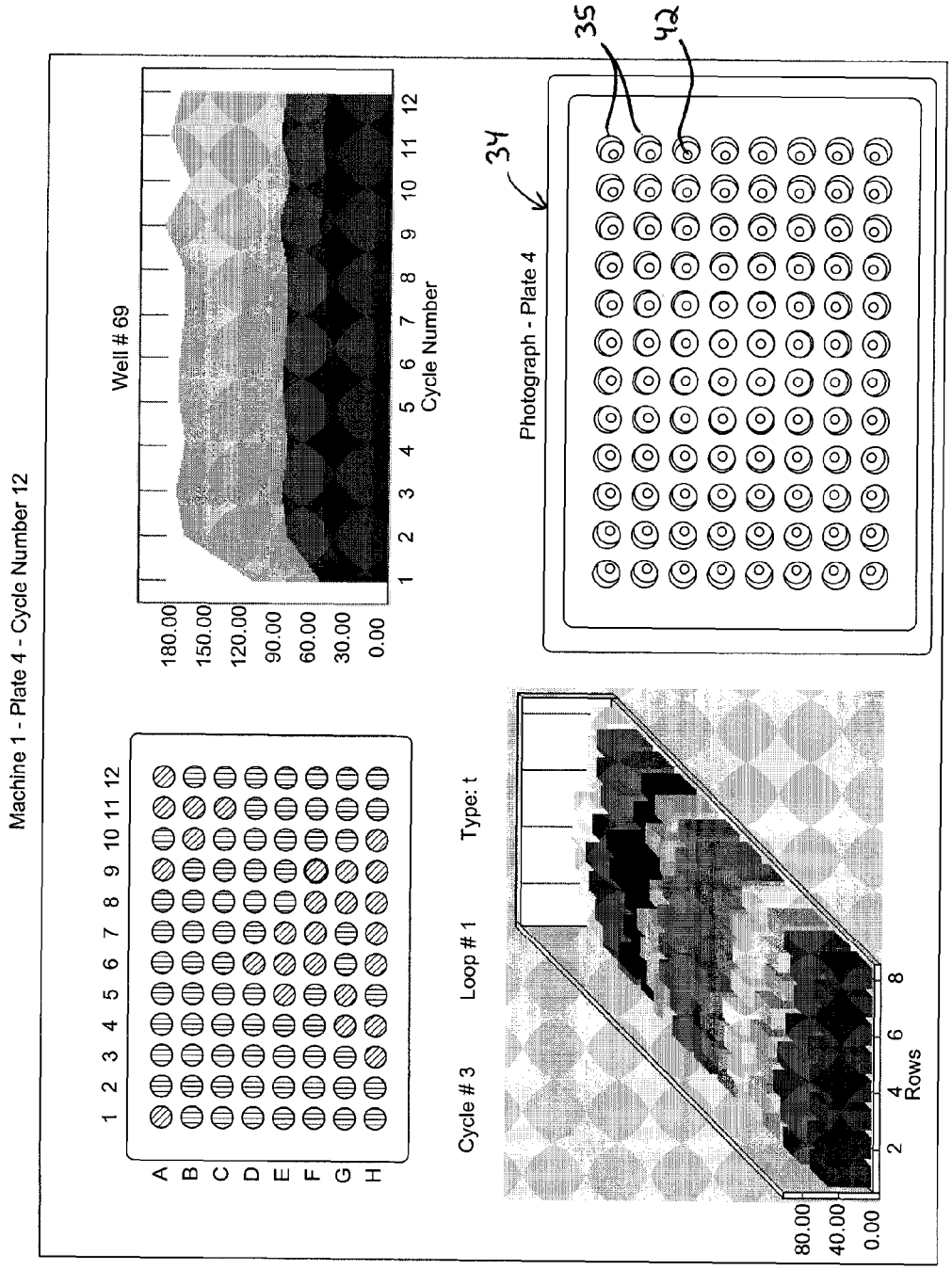
FIG. 6 is a schematic representation of a graphical user interface of the chemical monitor of FIG. 3 illustrating stored data regarding the status of a specified multi-well plate during a specified process.

In some instances, the synthesizer requires the use of multi-well plates having filters or frits 42 (see FIG. 6). It has been determined that frits have a time varying intensity that is not linearly proportional to DMT intensity or concentration. It is hypothesized that this is due to the individual absorption rates of each frit, and drain rate of each well. In the event that frits are utilized, the frit is generally clearly visible in the bottom of each well. The analyzer program can be configured to programmatically exclude the image of the frit from data collection. Similarly other features present in an image of a plurality of wells can be programmatically excluded from data collection.

Continuing with the exemplary oligonucleotide synthesizer shown in the figures, the analyzed images can be stored elsewhere on the central network (e.g., with the ".jpr" extension) and specific values which relate to the magnitude of the hue, saturation, luminance or the grayscale intensity of each well of the image can then be logged into an analysis results database 43 on the central network (see FIG. 3). This database can then be queried for either "real-time" monitoring and/or "historical" monitoring. Such configuration allows a technician to query the analysis results database while a process is going and visually identify problems in a near real-time fashion. Such configuration also allows future review of the storage location in a quality control (QC) fashion to look at images of completed batches for confirmation of problems that have happened in the past (i.e., historical monitoring) during the completed batches. The data analysis storage location can contain two table structures, one for laboratory information management system (LIMS) sequence data and one for real-time DMT values. The storage location may be comprised of any suitable database software including, but not limited to MICROSOFT® SQL SERVER® and MICROSOFT ACCESS®.

Certain determinations about the synthesis may be made from the observed images and/or the stored data. For example, the degree of color degradation may be tied to coupling efficiency in which a lower degree of color degradation indicates a higher coupling efficiency.

Observing a significant decline in the magnitude of the orange color emitted by the release of DMT can provide an early indication that a synthesis is suffering a general or catastrophic failure. In this regard, relatively quick color degradation within a couple of cycles is indicative of failure. Observation of such color degradation allows the synthesis to be stopped, automatically or by a technician, and restarted with fresh materials, thus saving time and money. Alternatively the system can be configured to automatically stop synthesis when changes in optical characteristics deviate substantially from a predefined threshold or range of acceptable values.

Individual wells or groups of wells that lose color can indicate a clogged nozzle in either a base or bulk delivery nozzle array of a synthesizer. For example, if a loss of color is observed in the same well of all plates, the color loss may indicate that a bulk reagent nozzle used in delivering reagents to multiple plates is clogged. Similarly, if a loss of color is observed in an entire row of a single plate, the color loss may indicate that a dispenser which should be delivering regents to the row is clogged.

The analyzer program can have access to the source sequence or protocol file for polymers to be synthesized in order to avoid confusing a failed individual polymer with one that is completed. The architecture of this software can be such that an independent viewer program 44 is provided to allow a technician to monitor the synthesis in near real-time that, in turn, allows for subjective evaluation apart from the analyzer program.

In one embodiment, a chemical reaction monitoring device of the invention is provided with a multiple algorithm detector (MAD) program 45. The MAD program obtains a list of current batches that are being synthesized and uses these for analysis as follows. Once the list is established, the MAD program retrieves all of the DMT data for each well and each plate for an entire synthesis batch while the synthesis is occurring. The MAD program then works its way through all of the wells and all of the plates for that batch, examining the data for each well and rendering a pass/fail decision of the chemical reaction within that well. The pass/fail decision is written back to the results analysis storage location. The list of batches is re-evaluated every few minutes to update this list and the pass/fail analysis repeated for the new list.

In some processes, oligonucleotide synthesis may have a protocol that contains N-number of deprotection loops (n being an integer value of one or more), in which case, such information is stored in a protocol file. The MAD program of the present invention may be configured to autonomously determine the number of deprotection loops. In this regard, the MAD program determines the number of deprotection loops based on the image file names. As noted above, the cycle, loop, and other information can be encoded in to the image filename. Thusly, the MAD program may calculate the summation of the data for all of the loops (1, 2, 3, . . . N number of loops per cycle). Similar to the analyzer program described above, the MAD program can take about 10 to 20 seconds, and, in particular embodiments can take about 8 seconds or less, to analyze the data for an entire synthesis. The MAD program can continuously perform analyses as new data is constantly being added to the analysis results storage location.

Though the structure of the MAD program can support N-number of failure detection algorithms, a primary algorithm in the MAD program is an exponential fit algorithm. For example in the case of oligonucleotide synthesis using DMT deprotection steps, it is known and has been observed that DMT intensity decreases at a predictable rate. In general, this rate is clearly observable given typical molar concentrations of DMT and the range of cycles. DMT intensity "slightly" or "gently" decreases as synthesis progresses and has been found to decay in a negative exponential decay according to the following equation:

$$\text{DMT Value} = e^{-kx} \qquad \text{Eq. 1}$$

where the value of "k" is the experimentally determined extinction coefficient which is a function of coupling efficiency and extinction coefficient that dictates the rate or degree in which the DMT diminishes, and "x" represents the cycle of the particular data point.

The MAD program may be configured to detect synthetic failures by calculating an "expected" optical signal for each well at any given cycle and comparing a detected value to the expected value. Detected values that differ substantially from the expected value are indicative of failure, whereas detected values that are sufficiently similar to the expected value are indicative of a passing score. For example, in the case of oligonucleotide synthesis, an expected DMT intensity value can be calculated based on the initial deprotection values and the particular cycle. The expected value is determined by a function derived where the expected DMT value (EV) is a function of initial reading, coupling efficiency, and cycle as follows:

$$EV = I_o * e^{-(100-\text{eff})/100 * C} \qquad \text{Eq. 2}$$

where "$I_o$" is the average initial intensity of the first three values, "eff" is the desired or assumed coupling efficiency in percent and "C" is the particular cycle expressed in an integer value from 0 to 100. During operation, the MAD program continuously compares the current DMT value against the expected value. Once the difference between the expected and real DMT value exceeds a pre-determined threshold, the well or oligo is flagged as "failed". For example, FIG. 9 illustrates DMT values for $1^{st}$, $2^{nd}$ and $3^{rd}$ deprotection loops of a particular well within a oligonucleotide synthesis cycle. In particular, there are three DMT loop values (y-axis) for every cycle (x-axis) and trityl value for the z-axis. The rear row represents an expected DMT value. In this case, it is apparent that the oligonucleotide suffered a catastrophic event around cycle no. 3 as the DMT values of the third cycle deviate substantially with respect to the expected value. In turn, the well can be flagged as "failed".

Acceptable values for a passing or failing synthetic step can be selected based on a tolerance level chosen by a particular user. For example, in the case of a relatively short polymer a relatively high loss in yield can be tolerated including, for example, a loss resulting in at least 85%, 90%, 91%, 92%, 93% or 94% yield per step. However, for synthesis of longer polymers lower loss of yield per step is typically tolerated since total yield loss is additive. In such cases a tolerable step yield can be, for example, at least about 95%, 96%, 97%, 98%, 99% or 99.5% yield per step. The predetermined threshold may be set very conservatively such that exceeding its limits all but ensures the oligonucleotide within the particular well contains too many failure products for use. One should appreciate, however, that other algorithms may be provided to perform more detailed analysis, corroborate with known standards, and/or define new standards.

As illustrated in FIG. 1, a graphical user interface (GUI) such as a flat-panel monitor or touch screen 46, a personal computer (PC) or other suitable means, may be provided on the oligonucleotide synthesizer to facilitate near real-time monitoring in which the GUI provides a user-friendly software interface on the oligonucleotide synthesizer. This configuration allows a technician to access the viewer program and thus view an image of the chemical reaction within the wells of the multi-well plate while the oligonucleotide synthesizer is running. Such configuration also allows a technician to browse the latest images (see, e.g., Photograph—Plate 4 in FIG. 6) and thus provides a near real-time monitoring configuration. Accordingly, the technician can be notified of a detected failure in a substantially real-time manner such that the user can stop the synthesis if desired.

In one embodiment, the viewer program is a graphical user interface (GUI) program, which is provided to readily provide user-friendly data to a technician or other authorized personnel. The GUI program provides a component of the chemical reaction monitoring system that is directly used by humans allowing human interaction with the system. Accordingly, the system can communicate information to a user through the GUI. Conversely, a user can provide information or a command to the system through the GUI program. The GUI program may connect to the analysis results storage location and may continuously retrieve the latest set of analyzed data. The GUI program can be configured to output a visual representation of the stored data. In one embodiment, the GUI program visually provides the user information regarding synthesis by way of touch screen 46 or other suitable means. The GUI program also serves as centralized real-time nerve center that allows anyone on a PC connected to the network to use, review or manipulate data in connection with ongoing or previously performed chemical reactions.

In one embodiment, the GUI program provides a windows-type graphical interface that may include a digital photograph of a specified plate or other representation of a plate. The GUI may also provide a visual representation as to the status of the chemical reactions taking place within each well. For example, wells that are marked as "failed" may be shown in red (e.g., vertical cross-hatching of wells A2 through A8 and A10), while wells that marked as "pass" may be shown in green (e.g., angled cross-hatching of wells A1, A9, A11 and A12). The GUI program may graphically provide the DMT intensity values of each well of a multi-well plate as shown in the lower left-hand corner of FIG. 6, and/or the cumulative DMT intensity values within a specified well, as shown in the upper right-hand corner of FIG. 6. One will appreciate, however, that the GUI program may be configured to visually represent the data of the analysis results storage location in other suitable means including, but not limited to, numeric representations, graphs, charts and/or tables.

In one embodiment, the chemical reaction monitor of the present invention is configured for real-time data monitoring (RTDM). A RTDM program 47 may be provided independently of, or integral to, the graphical user interface program or other program of the invention. The RTDM program mines data, such as that described above, for patterns of failure and renders a "pass/fail" decision on whole or partial processes.

The typical cycle time of an oligo coupling, one step of an oligonucleotide synthesis, takes approximately 10 to 15 minutes. As noted above, the time of a complete analysis or processing cycle of the analyzer program and the MAD program may be approximately 8 seconds or less. As the processing cycle represents a small percentage time as compared to the oligo coupling (e.g., 0.8% to 1.3%), the chemical reaction monitor of the present invention may be considered "real-time". Furthermore, the rate of analysis or processing by the analyzer and MAD programs may be substantially equal to or greater than the rate of image generation or acquisition by the camera. In particular, the analyzer program may process an image and export the data extracted from the image to the analysis results storage location substantially as fast as an image is created. In other words, as soon as a picture is taken, the analyzer program analyzes the image and the data is logged.

Given that the data is available from the analysis results storage location in "real-time", the RTDM program can be configured to occur continuously. In particular, the RTDM program may serve as a quality-control program that continuously scans the analysis results storage location for new records and performs data mining from the stored data to ascertain whether or not a particular chemical reaction has passed or failed quality control.

In the case of oligonucleotide synthesis, there are many different failure patterns that one may observe in DMT intensity. For example, the intensity, or "concentration" of DMT directly correlates to the amount of and the quality of the oligonucleotide. In general, for a given oligonucleotide within a well, if the same DMT level is maintained throughout the entire synthesis, it is generally accepted that the quality of the oligonucleotide will be acceptable (see e.g., FIG. 4). On the other hand, should any significant changes be observed in the DMT level, such as an increasingly negative slope, or an exponential decay, etc, the oligonucleotide quality would likely be unacceptable (see e.g., FIG. 5).

Figure 4:
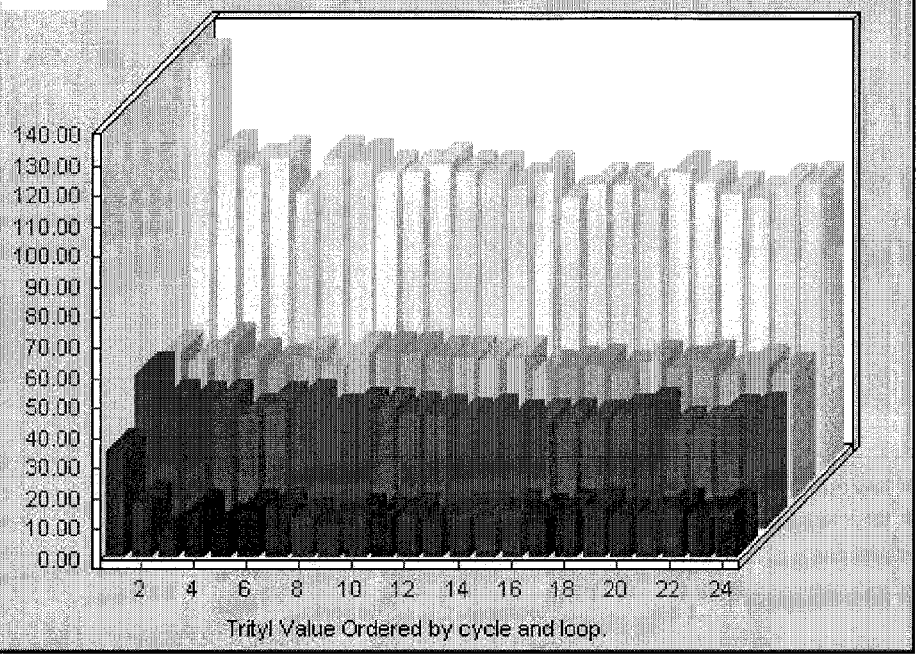
FIG. 4 is a graphical representation of DMT measurements of a well of the multi-well plate taken during an exemplary successful oligonucleotide synthesis.

FIG. 4 shows a graphical representation of DMT intensity measurements of a well of a multi-well plate taken during each cycle, and loop thereof, during an exemplary successful oligonucleotide synthesis. The rear row represents the final or summed measurement of all of the discrete DMT measurements that have occurred throughout the synthesis. In this example, the rear row "approximates" a straight line indicating that the DMT level is substantially maintained throughout the entire synthesis. The rear row does not significantly slope up or down, nor does the rear row have any aberrations. Instead, the substantially flat graph indicates that the oligonucleotide in question is "good".

Figure 5:
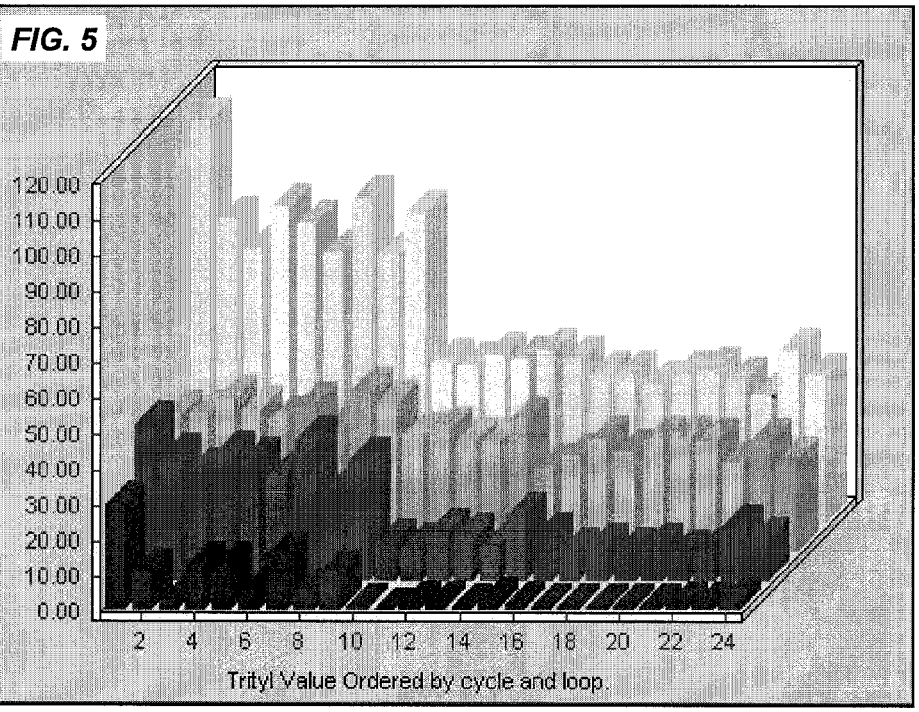
FIG. 5 is a graphical representation of DMT measurements of a well of the multi-well plate taken during an exemplary unsuccessful oligonucleotide synthesis.

In contrast, FIG. 5 shows a graphical representation of DMT measurements of a well of a multi-well plate taken during an exemplary unsuccessful oligonucleotide synthesis. The DMT intensity drops off sharply around cycle 9. In addition, the rear row, which again represents the final or summed measurement, resembles the unit step function indicating that the level of DMT intensity as significantly decreased. As opposed to the "flat" response of the "good" oligonucleotide in FIG. 4, the step response of FIG. 5 indicates that the oligonucleotide is "bad". Accordingly, a failed polymer synthesis can be identified due to a departure from an expected trend in a plot of optical signal change vs. cycle number.

As the DMT intensity can be monitored to determine whether an oligonucleotide is "good" or "bad", an RTDM program may be configured to mine the data of an analysis results storage location for patterns similar to those described above, alerting the appropriate personnel when failures are detected.

Advantageously, the chemical reaction monitor of the present invention allows parallel observation of a plurality of wells and allows observation of each well individually. Furthermore, the monitor of the present invention allows monitoring a plurality of wells with one imaging device.

Advantageously, the chemical reaction monitor of the present invention allows capturing data, analyzing the data, and using the data in a near real-time manner or in a historical manner to measure performance of the oligonucleotide synthesizer. The monitor is configured to detect and announce suspected failures of oligonucleotides, and may be configured to render a quantifiable number relating to oligonucleotide quality, akin to coupling efficiency and so on.

Advantageously, the imaging, analyzing, and viewing processes can be discrete and autonomous. If any one or more of the processes crashes or otherwise fails, the chemical reaction monitor of the present invention can render a diagnosis based on the nature of the failure and communicate one or more potential solutions to a graphical user interface. The monitor can further interrupt one or more steps of a synthetic reaction. In one embodiment synthesis in all wells can be paused until a further command is provided by an external user. In other embodiments, delivery of reagent to a subset of wells that have experienced a failure can be discontinued. An advantage of the monitor is that interruption of only a subset of synthetic steps, such as suspending reagent delivery to a subset of failed wells, allows the remaining processes to continue operation while avoiding wasteful delivery of reagents to previously failed wells. Furthermore, the system can be configured such that if the analyzer program malfunctioned, the chemical reaction monitor of the present invention would allow the imaging and viewing processes to continue.

A chemical reaction monitor of the present invention can be configured to make decisions regarding whether or not to continue synthesis on a multi-well plate based on one or more criteria including, without limitation, the cost of proceeding with the synthesis vs. the value of the synthesis, time constraints on instrument scheduling based on the number of plates to be processed after the particular plate being monitored, the state of repair of the machine based on identification of global failures as well as other quality metrics determined in a manufacturing environment. Information regarding the optical properties of a reaction can be collected, displayed or manipulated in the time domain (i.e. intensity vs. time). In particular embodiments, time domain data can be converted by Fourier transform to provide data in the frequency domain. Thus, periodicity in optical property data will result in an observable frequency component. The Fourier transform can be coupled with wavelet analysis such that the frequencies can be correlated with different variables, such as the particular monomer being reacted in a given cycle and well (for example, an A, C, G, or T phosphoramidite monomer), the particular instrument being used (in cases where multiple instruments are being monitored) or a particular subcomponent of an instrument (for example, a valve or delivery nozzle). Wavelet analysis incorporates a third dimension of the transform so that such variables can be represented in the third dimension and evaluated to determine if criteria important to a manufacturing environment are being properly met. If criteria are not being met the information from wavelet analysis can be used to direct adjustment of instrument activity to achieve a desired manufacturing goal. Such adjustments can be communicated to a GUI in the form of suggested solutions to a perceived malfunction. Alternatively, adjustments can be made in an automated fashion using a feedback loop in which the function of a component of the instrument is automatically altered in response to the perceived malfunction.

In one embodiment, the chemical reaction monitor includes a data registration and extraction algorithm for determining the DMT intensity within each well, which algorithm may include one or more of the following steps:
1) Read image;
   a) Determine plate configuration (e.g., 96 or 384 well plate);
2) Register;
   a) Use fiducial mark on plate holder (384 wells);
      i) Move to middle top well and pattern recognize;
      ii) Move to left and right of top row and recognize wells;
      iii) Create fit of line of centers of top row wells;
      iv) Use to calculate angle of rotation;
   b) OR use 2 corners of plate well detection (96 and/or 384 well plates);
      i) Use to calculate angle of rotation;
   c) Rotate image;
3) Find frit location;
   a) Find all well centers using plate measurements;
   b) Apply algorithm of optical parallax to identify frit position with respect to well center as viewed by camera;
      i) OR use 2×2 algorithm and thresholding to pattern recognize frit features independent of well positions on plate;
   c) Create circle around frit with known diameter;
   d) Create circle around center of well with known diameter;
   e) Average intensity of pixels inside outer circle but w/out frit area;
4) Store values in analysis results database per plate per cycle per well per run;
5) Repeat above for new image automatically.

In one embodiment, the chemical reaction monitor includes a data analysis and Pass/Fail algorithm for identifying specific failed oligonucleotides, which algorithm may include one or more of the following steps:
1) Read image data per loop per plate per synthesis cycle per well from analysis results database;
2) Read info for subject oligonucleotide from LIMS database (e.g., sequence length);
3) Sum all 3 loops per synthesis cycle (see, e.g., FIG. 4);
4) Determine average Intensity of first 3 cycles for each well;
   a) If no value, assume no data and then set initial Intensity value accordingly for monitor cameras from configuration file;
   b) If low value, FAIL oligonucleotide;
5) Check last synthesis step for modifier from LIMS;
   a) If modifier does not have DMT then exclude last cycle from trending;
6) Determine Intensity exponential decay vs. cycle index;
   a) Assume coupling efficiency at 98.5%;
   b) Calculate expected value of DMT for each cycle based on assumed coupling efficiency;
   c) Assume allowed variation of calculated vs. measured DMT value at set % value form configuration file;
   d) Compare summed loop value with calculated value for every cycle;
   e) If difference>+− se value then FAIL oligonucleotide;
7) Determine scaling of DMT intensity between loops;
   a) Loop1/loop2/loop3 Intensity ratio for all cycles;
   b) Compare with set criteria;
   c) If outside set criteria then FAIL oligonucleotide;
8) Step detection in synthesis;
   a) Check all loops and sum of loops for appearance of step (decrease or increase) in DMT intensity;
   b) Compare step with set value from configuration file;
   c) If step>set value FAIL oligonucleotide;
9) Store PASS/FAIL values in database per plate per cycle per well per run;
10) Repeat above for new image automatically.

In one embodiment, the chemical reaction monitor includes a further data analysis and Pass/Fail algorithm for identifying trends for improving quality control and quality assurance, which algorithm may include one or more of the following steps:
1) Read Pass/Fail result per loop per plate per synthesis cycle per well from database;

2) Read info for this oligonucleotide from LIMS database, e.g. sequence length;
3) Pattern recognize Row-wise or Column-wise global failures;
4) Pattern recognize local area failures;
   a) If concentration of FAILED oligonucleotides within specific area of plate;
5) Compare with failure mode from configuration file;
6) Alert Real-Time data monitoring for failure mode;
7) Pause oligonucleotide synthesis;
8) Send Failure mode result to LIMS database;
9) Repeat above for all runs.

In one embodiment, the chemical reaction monitor includes a further algorithm for monitor and control synthesis, which algorithm may include one or more of the following steps:
1) Get Pass/Fail per well per oligonucleotide;
   a) Calculate from previous algorithm submitted;
   b) Receive data form database real time using RTDM GUI monitor for specific synthesis batch;
2) According to pass/fail criterion for whole plate and/or whole synthesis batch and using the above P/F numbers for individual wells, decide on plate/batch quality;
3) Alarm operators on quality;
   a) Use % number of failed/good wells in plate/batch;
   b) Use a "score" of goodness for plate/batch calculated using above criterion;
4) Proceed to pause only synthesis;
5) Suggest different modes/action plans of hardware configuration for rest of synthesis cycles;
   a) E.g. not firing all banks;
   b) E.g. resynthesizing only one of plates in-situ in synthesizer system;
   c) Etc.;
6) Operator confirms actions suggested form menu;
   a) Possibly, for specific, already confirmed or emergency modes, operator input is bypassed and action is taken by computer on stopping/continuing synthesis in specific mode;
7) Action taken and control of synthesizer system is performed by software component of monitor or via native software of synthesizer system;
8) Synthesizer system returns to normal operation with monitoring only; Parallel, Return log and values of actions taken above in analysis results database.

Figure 10:
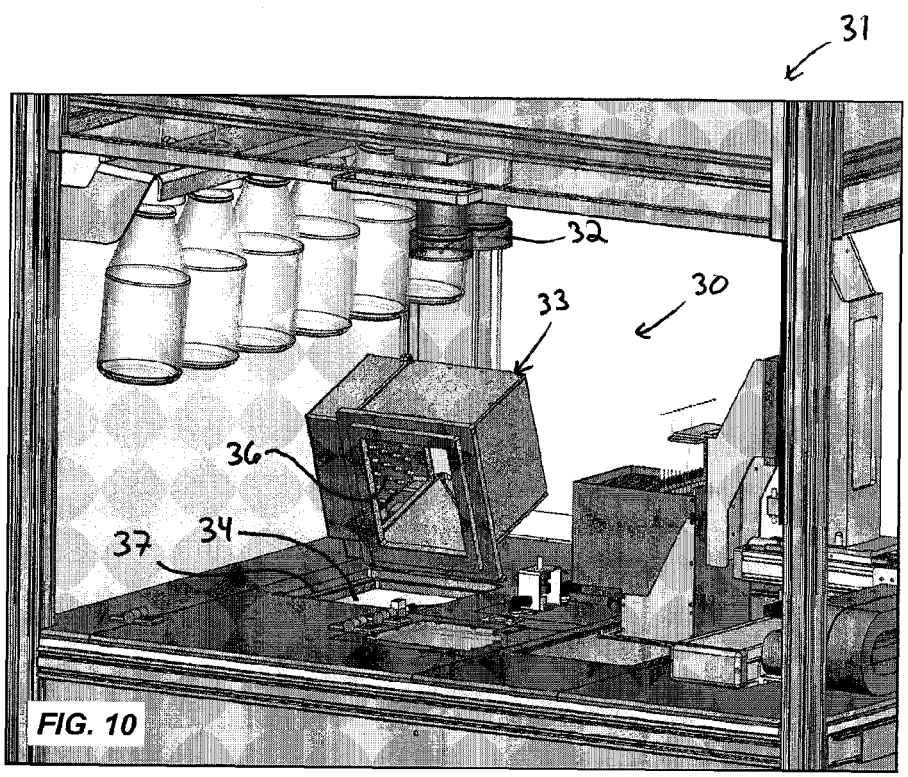
FIG. 10 is a perspective view of another chemical reaction monitor of the present invention including a camera device and a lighting device mounted on an oligonucleotide synthesizer for capturing images of a multi-well plate.
Figure 11:
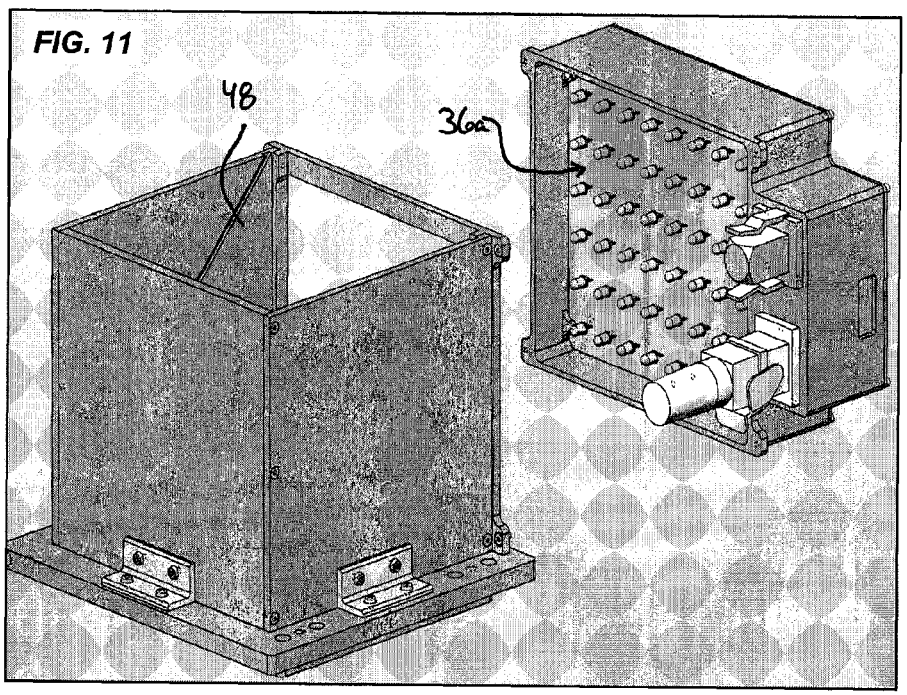
FIG. 11 is an enlarged perspective view of the lighting device of FIG. 10.

In another embodiment of the present invention, chemical reaction monitor 30a is similar to chemical reaction monitor 30 above but includes a modified lighting device 33a and a modified software component. Like reference numerals have been used to describe like components of 30 and 30a. In this embodiment, the lighting device includes a single LED array 36a pivotally mounted and positioned to one side of glass window 37a, as shown in FIG. 10. In this embodiment, a transparent reflector 48 is provided which directs the light rays of the LED array downward to illuminate multi-well plate 34a. The transparent reflector allows camera device 32a to take a picture of the multi-well plate when the LED array is pivoted downward and in place about the glass window illuminating the multi-well plate. A diffuser or optical filter or both can be applied prior to the light hitting the transparent reflector (beam splitter) if desired, as set forth previously herein.

Figure 12:
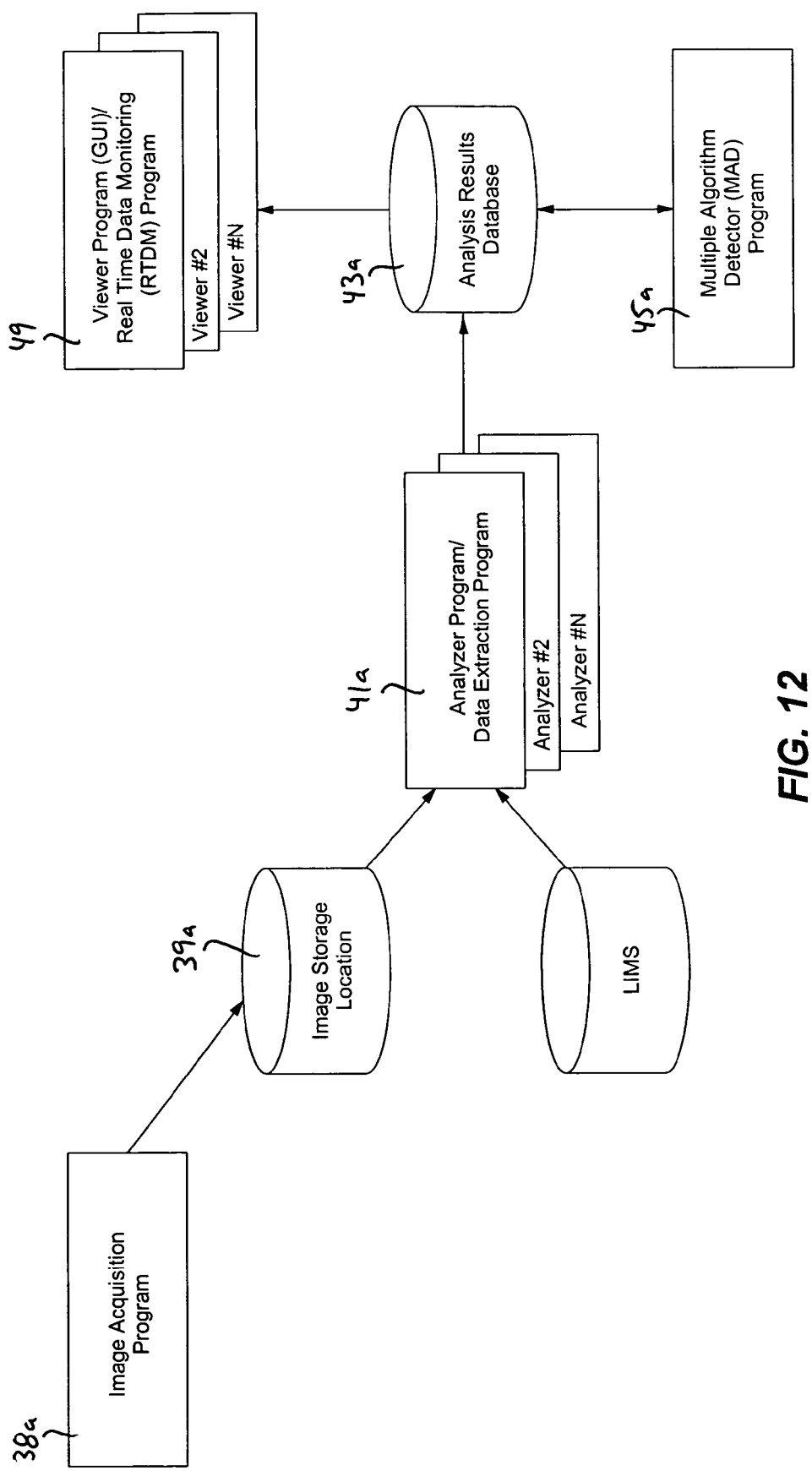
FIG. 12 is a perspective view of a chemical reaction monitor of the present invention including a camera device and a lighting device mounted on an oligonucleotide synthesizer for capturing images of a multi-well plate.

In this embodiment, the software component includes an integrated viewer program and RTDM program, generally referenced by the numeral 49 in FIG. 12. One will appreciate that any two or more of the software subcomponents may be integrated into a single program. Thus, the programs and network locations set forth above are exemplary and not intended to limit the number or type of functions that can be performed by particular components or programs.

For convenience in explanation and accurate definition in the appended claims, the terms "up" or "upper", "down" or "lower", "left" and "right" are used to describe features of the present invention with reference to the positions of such features as displayed in the figures.

In many respects the modifications of the various figures resemble those of preceding modifications and the same reference numerals followed by subscript "a" designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A chemical reaction monitoring system for parallel monitoring of a plurality of chemical reactions, said system comprising:
   a plurality of wells, each well of said plurality of wells comprising a reagent for a chemical reaction;
   a lighting device for illuminating the plurality of wells;
   a camera device configured to obtain an image of the plurality of wells
   an analyzer program for determining a specific value corresponding to the extent of chemical reaction within each well at the time the image was obtained;
   an analyzer program for determining whether a difference between a value expected if the chemical reaction is successful and said specific value indicates failure of the chemical reaction within a well; and
   a dispensing device configured to discontinue reagent delivery to one or more wells where failure is indicated while maintaining reagent delivery to wells where failure is not indicated, wherein said analyzer program includes an instruction to resume reagent delivery to said one or more wells if one or more criteria are met.

2. The chemical reaction monitoring system of claim 1, wherein the chemical reaction is oligonucleotide synthesis.

3. The chemical reaction monitoring system of claim 1, wherein said plurality of wells comprises a multi-well plate.

4. The chemical reaction monitoring system of claim 1, wherein said lighting device comprises a light emitting diode (LED) array.

5. The chemical reaction monitoring system of claim 4, wherein said LED array includes a first array and a second array positioned on either side of a multi-well plate-viewing window.

6. The chemical reaction monitoring system of claim 4, wherein said LED array includes a single array positioned pivotally mounted on one side of a multi-well plate-viewing window.

7. The chemical reaction monitoring system of claim 1, wherein said camera device comprises a charge couple device (CCD) capable of imaging the plurality of wells simultaneously.

8. The chemical reaction monitoring system of claim 1, wherein said analyzer program processes said image.

9. A chemical synthesis system comprising:
(a) a sample holder placed to support a plurality of wells;
(b) a liquid dispenser placed to dispense a liquid to said plurality of wells;
(c) a liquid removal device placed to remove said liquid from said plurality of wells;
(d) a lighting device for illuminating said plurality of wells;
(e) a camera device configured to an obtain image of said plurality of wells; and
(f) a computer system configured to:
  (i) determine a specific value corresponding to the extent of chemical reaction within each well at the time the image was obtained;
  (ii) determine whether a difference between a value expected if the chemical reaction is successful and said specific value indicates failure of the chemical reaction within a well; and
  (iii) signal said liquid dispenser to discontinue reagent delivery to one or more wells where failure is indicated while maintaining reagent delivery to wells where failure is not indicated, wherein said computer system comprises an analyzer program including an instruction to resume reagent delivery to said one or more wells if one or more criteria are met.

10. The system of claim 9, wherein said computer system is further configured to write specific values to a data storage location.

11. The system of claim 9, wherein a warning message is generated if said specific values are within a pre-defined range of failure.

12. The system of claim 9, wherein said liquid removal device comprises a centrifuge rotor for orbiting said plurality of wells about an axis of rotation.

13. The system of claim 9, wherein said liquid removal device comprises a liquid aspirating tube.

14. The system of claim 9, wherein the chemical reaction is oligonucleotide synthesis.

15. The system of claim 9, wherein said plurality of wells comprises a multi-well plate.

16. The system of claim 9, wherein said lighting device comprises a light emitting diode (LED) array.

17. The system of claim 14, wherein said LED array includes a first array and a second array positioned on either side of a multi-well plate-viewing window.

18. The system of claim 14, wherein said LED array includes a single array positioned pivotally mounted on one side of a multi-well plate-viewing window.

19. The system of claim 9, wherein said camera device comprises a charge couple device (CCD) capable of imaging the plurality of wells simultaneously.

20. The system of claim 1, wherein said one or more wells is a subset of wells where failure is indicated.

21. The system of claim 2, wherein said analyzer program includes an instruction to resume reagent delivery to said one or more wells if the value of the synthesis is greater than the cost of the synthesis.

22. The system of claim 1, wherein the value expected if the chemical reaction is successful and said specific value each comprises a plurality of measurements.

23. The system of claim 22, wherein said analyzer program includes an instruction to indicate failure if the change in difference between the value expected if the chemical reaction is successful and said specific value comprises an increasingly negative slope.

24. The system of claim 9, wherein said one or more wells is a subset of wells where failure is indicated.

25. The system of claim 14, wherein said analyzer program includes an instruction to resume reagent delivery to said one or more wells if the value of the synthesis is greater than the cost of the synthesis.

26. The system of claim 9, wherein the value expected if the chemical reaction is successful and said specific value each comprises a plurality of measurements.

27. The system of claim 26, wherein said analyzer program includes an instruction to indicate failure if the change in difference between the value expected if the chemical reaction is successful and said specific value comprises an increasingly negative slope.

28. A system for monitoring polymer synthesis, said system comprising:
a plurality of wells, each well of said plurality of wells providing a location for the synthesis of a polymer from a plurality of reaction components;
an analyzer program for determining a specific value corresponding to the extent of incorporation of a reaction component into a growing polymer within each well;
an analyzer program for determining whether a difference between a value expected if incorporation of the reaction component into the growing polymer is successful and said specific value indicates failure of the polymer synthesis within a well; and
a dispensing device configured to discontinue reagent delivery to one or more wells where failure is indicated while maintaining reagent delivery to wells where failure is not indicated, wherein said analyzer program includes an instruction to resume reagent delivery to said one or more wells if one or more criteria are met.

29. The system of claim 28, wherein the reaction component is selected from the group consisting of monomeric reaction components and polymeric reaction components.

30. The system of claim 28, wherein the polymer synthesis comprises polynucleotide synthesis.

31. The system of claim 30, wherein said analyzer program further includes an instruction to deliver reagents in a plurality of cycles.

32. The system of claim 30, wherein said analyzer program includes an instruction to deliver reagents for deprotection, coupling, capping or oxidizing.

33. The system of claim 30, wherein the specific value is determined by determining the amount of blocking group released from the growing polymer.

34. The system of claim 33, wherein the blocking group comprises dimethyltrityl.

35. The system of claim 28, wherein said plurality of wells comprises a multi-well plate.

36. The system of claim 28, wherein said one or more wells is a subset of wells where failure is indicated.

37. The system of claim 28, wherein said analyzer program includes an instruction to resume reagent delivery to said one or more wells if the value of the synthesis is greater than the cost of the synthesis.

38. The system of claim 28, wherein the value expected if incorporation of the reaction component into the growing polymer is successful and said specific value each comprises a plurality of measurements.

39. The system of claim 38, wherein said analyzer program includes an instruction to provide a value indicating failure if the change in difference between the value expected if the incorporation of the reaction component into the growing polymer is successful and said specific value comprises an increasingly negative slope.

40. The system of claim 28 further comprising a camera device configured to obtain an image of the plurality of wells.

41. The system of claim 40 further comprising a lighting device for illuminating the plurality of wells.

* * * * *

UNITED STATES PATENT AND TRADEMARK OFFICE
CERTIFICATE OF CORRECTION

PATENT NO.        : 7,887,752 B2
APPLICATION NO.   : 10/762931
DATED             : February 15, 2011
INVENTOR(S)       : David Louis Heiner et al.

It is certified that error appears in the above-identified patent and that said Letters Patent is hereby corrected as shown below:

At Title Page 1, Abstract, Line 7, change "the these" to --these--.

At Title Page 3, Item [56], Col. 2, Line 13, change "Endoctinol." to --Endocrinol.--.

At Title Page 3, Item [56], Col. 2, Line 17, change "1747-7755" to --7747-7755--.

At Title Page 3, Item [56], Col. 2, Line 21, change "Cystosolic" to --Cytosolic--.

At Title Page 4, Item [56], Col. 1, Line 29, change "at.," to --al.,--.

At Title Page 4, Item [56], Col. 1, Line 59, change "bionsensor,"" to --biosensor,"--.

At Title Page 4, Item [56], Col. 2, Line 2, change "Guibault" to --Guilbault--.

At Title Page 4, Item [56], Col. 2, Line 6, change "Cytocensor" to --Cytosensor--.

At Title Page 5, Item [56], Col. 2, Line 3, change "Microinstumentation," to --Microinstrumentation,--.

At Title Page 5, Item [56], Col. 2, Line 8, change "catechollamines" to --catecholamines--.

At Col. 21, Line 8, change "an obtain" to --obtain an--.

Signed and Sealed this
Twentieth Day of September, 2011

David J. Kappos
*Director of the United States Patent and Trademark Office*